AUTOMATIC RECORDING NEPHELOMETER

Filed Aug. 1, 1956 15 Sheets-Sheet 1

INVENTORS
WADE W. ALLEN
CLAYTON D. ALWAY
BY
Woodhams Blanchard and Flynn
ATTORNEYS March 27, 1962 W. W. ALLEN ETAL 3,026,764

AUTOMATIC RECORDING NEPHELOMETER

Filed Aug. 1, 1956 15 Sheets-Sheet 2

INVENTORS
WADE W. ALLEN
CLAYTON D. ALWAY
BY
Woodhams Blanchard & Flynn
ATTORNEYS

AUTOMATIC RECORDING NEPHELOMETER

Filed Aug. 1, 1956 15 Sheets-Sheet 3

INVENTORS
WADE W. ALLEN
CLAYTON D. ALWAY
BY
Woodhams Blanchard and Flynn
ATTORNEYS March 27, 1962 W. W. ALLEN ETAL 3,026,764

AUTOMATIC RECORDING NEPHELOMETER

Filed Aug. 1, 1956 15 Sheets-Sheet 4

INVENTORS
WADE W. ALLEN
CLAYTON D. ALWAY
BY
Woodhams Blanchard & Flynn
ATTORNEYS

AUTOMATIC RECORDING NEPHELOMETER

Filed Aug. 1, 1956 15 Sheets-Sheet 5

INVENTORS
WADE W. ALLEN
CLAYTON D. ALWAY
BY
Woodhams Blanchard & Flynn
ATTORNEYS INVENTORS
WADE W. ALLEN
CLAYTON D. ALWAY
BY
Woodhams Blanchard & Flynn
ATTORNEYS INVENTORS
WADE W. ALLEN
CLAYTON D. ALWAY
BY
Woodhams Blanchard and Flynn
ATTORNEYS INVENTORS
WADE W. ALLEN
CLAYTON D. ALWAY
BY
Woodhams Blanchard and Flynn
TTORNEYS March 27, 1962 W. W. ALLEN ET AL 3,026,764

AUTOMATIC RECORDING NEPHELOMETER

Filed Aug. 1, 1956 15 Sheets-Sheet 9

INVENTORS
WADE W. ALLEN
CLAYTON D. ALWAY
BY
Woodhams Blanchard and Flynn
ATTORNEYS INVENTORS
WADE W. ALLEN
CLAYTON D. ALWAY
BY
Woodhams Blanchard & Flynn
ATTORNEYS

AUTOMATIC RECORDING NEPHELOMETER

Filed Aug. 1, 1956 15 Sheets-Sheet 11

INVENTORS
WADE W. ALLEN
CLAYTON D. ALWAY
BY
Woodhams Blanchard & Flynn
ATTORNEYS INVENTORS
WADE W. ALLEN
CLAYTON D. ALWAY
BY
Woodhams Blanchard and Flynn
ATTORNEYS

AUTOMATIC RECORDING NEPHELOMETER

INVENTORS
WADE W. ALLEN
CLAYTON D. ALWAY
BY
Woodhams Blanchard and Flynn
ATTORNEYS INVENTORS
WADE W. ALLEN
CLAYTON D. ALWAY
BY
Woodhams Blanchard and Flynn
ATTORNEYS March 27, 1962 W. W. ALLEN ETAL 3,026,764

AUTOMATIC RECORDING NEPHELOMETER

Filed Aug. 1, 1956 15 Sheets-Sheet 15

INVENTORS
WADE W. ALLEN
CLAYTON D. ALWAY
BY
Woodhams Blanchard & Flynn
ATTORNEYS 3,026,764
Patented Mar. 27, 1962

3,026,764

AUTOMATIC RECORDING NEPHELOMETER

Wade W. Allen, Kalamazoo Township, Kalamazoo County, and Clayton D. Alway, Kalamazoo, Mich., assignors to The Upjohn Company, Kalamazoo, Mich., a corporation of Michigan Filed Aug. 1, 1956, Ser. No. 601,558
15 Claims. (Cl. 88—14)

This invention relates in general to apparatus for automatically examining one or more specimens and automatically recording certain preselected data obtained by such examining. The invention relates particularly to apparatus adapted for optically examining or inspecting a large number of different specimens or samples of material for a predetermined chemical or physical characteristic and recording the data obtained by such examining in a permanent form, there being one record receiving element for each sample, and the examining and recording with respect to each sample being carried out independently at selected time intervals in a predetermined total period of time.

While the principles underlying the present invention are broadly applicable in many fields involving the examination or investigation of chemical or physical characteristics of materials and the recording of changes taking place therein, the invention specifically arose out of certain needs in the pharmaceutical industry and the apparatus disclosed hereinafter was developed for the purpose of meeting such needs. Accordingly, the following description will refer particulraly to certain needs of the pharmaceutical industry and the apparatus involved will be directed toward those needs, but it will be expressly understood that this is for illustrative purposes only and that no limitation should in any sense be implied therefrom.

In the pharmaceutical industry, as in many others, research activities, and especially those connected with antibiotic investigation, require the determination of the physical or chemical changes taking place in each of a large number of samples of material, and require further the recording of the results of such investigation on a plurality of record receiving members, at least one member being provided for each sample. For example, in determining the antibiotic potency of a given material, it is customary to expose such material to a large number of bacterial materials in vary concentrations, in various types of media, and over varying periods of time. Thus, where even one antibiotic material is to be treated under a variety of such conditions, samples of it will be placed in a series of containers, each one containing a different bacterial material or similar bacterial materials under different conditions of concentration or in different media or subjected to other variations. The reaction of such antibiotic with respect to the bacteria in each said container will be observed repeatedly, such as at one hour intervals, over a relatively long period of time, such as twenty-four hours or more.

To conduct the necessary examinations of each container and record the results thereof by the manual processes and apparatuses presently available is obviously a very costly and fatiguing task, which is practicable only by employing large numbers of skilled, or at least relatively skilled, personnel, who must work in shifts, particularly where large numbers of samples must be regularly and continuously examined over long periods of time, as in an excess of eight hours. The results of such an investigation are not only subject to the human errors of the individuals in each work shift, but these errors are compounded by fatigue and legitimate variations in the opinions and perceptions of the personnel in the different shifts. It becomes clearly apparent by the mere statement of these problems that, if a device can be found by which these investigations can be made, and the results recorded automatically with only occasional attention being given it by a single person, the problems of human errors can be greatly reduced, if not eliminated, and the extra research personnel presently required for this type of work can be assigned to other tasks and the advancement of scientific knowledge thereby greatly accelerated.

In the particular investigation herein utilized to illustrate the invention, a physical condition, whose change is observable, is adopted as a measure of the effectiveness of an antibiotic against the micro-organisms being employed for test purposes. Changes in the physical condition can be readily measured by variations in the turbidity of a suitable medium, as an aqueous nutrient media, in which the material is placed. Accordingly, the following description will proceed in terms of the measurement of such turbidity, but it will be readily apparent that the principles of the invention may be applied to other types of physical characteristics which can effect variations in a beam of electro-magnteic energy, which variations will be indicative in a known degree of the condition being examined. Thus, in addition to the measuring of changes in turbidity, it is entirely practicable to utilize substantially the same apparatus for measuring changes in color, changes in temperature, changes in capacity to fluoresce, transmissiveness or reflectivtiy to both visible and invisible wave energy, and many other variable characteristics too numerous to enumerate, but which are now, or hereafter may become, well known to persons acquainted with this field. Further, the changes which take place in the material being examined may occur within the test material itself as in the case of checking the effectiveness of an antibiotic against a micro-organism, or the changes may take place between successive observations as the result of externally originating influences, such as a radiation, applied to the sample.

It is recognized that many types of devices have been suggested for automatically investigating these and other similar characteristics of materials which are light transmissive or reflective in varying degrees. Also, many types of separate control or recording apparatuses have been devised for responding to changes in such characteristics. However, insofar as is known to us, no such multiple recording system has been devised capable of meeting the requirements above outlined.

Accordingly, a principal object of this invention has been to provide an apparatus for examining or inspecting successively a large number of receptacles, or test positions, responding to wave energy transmissive or reflective characteristics of material within said receptacles or at said positions, then recording on a plurality of record receiving members, one member being associated with each receptacle, the results of such investigation, and repeating such steps with respect to each receptacle and its corresponding record receiving member at regular and predetermined intervals.

A further object of the invention has been to provide an apparatus, as aforesaid, which will be capable of extreme flexibility, both with respect to the number of receptacles or test positions which can be handled in a given sequence of operations, and with respect to the kinds of investigations which may be made with respect to each of said receptacles.

A further object of the invention has been to provide an apparatus, as aforesaid, in which the relationship of the recording mechanism to the investigating mechanism is sufficiently positive that the likelihood of error, at least with respect to the correlation between a given record and the receptacle to which it pertains, is entirely eliminated.

A further object of the invention has been to provide apparatus, as aforesaid, which employs sufficiently familiar principles and devices that it can be maintained in good operating condition by ordinary factory and/or laboratory maintenance personnel.

A further object of the invention has been to provide apparatus, as aforesaid, which is not unreasonably difficult nor costly to build, which will require relatively little maintenance during operation, and which is capable of handling an extremely large number of receptacles as a routine matter.

A further object of the invention has been to provide apparatus, as aforesaid, which by slight modification may readily be made responsive to many different types of characteristics of the material under investigation.

A further object of the invention has been to provide apparatus, as aforesaid, in which both the intervals between examinations of one selected sample, and the total period of investigation spanning several of such intervals, can with simple modifications be varied widely.

A further object of the invention has been to provide apparatus, as aforesaid, which has sufficient safety features, that it can operate under a variety of ordinary industrial conditions for prolonged periods of time while producing accurate data and, therefore, requires only occasional attention during such operation.

A further object of the invention has been to provide apparatus, as aforesaid, wherein the records being kept are permanent and can be readily read by an operator at any time during the course of the investigation, both for the information therein directly contained and to identify quickly any malfunctioning of the apparatus.

A further object of the invention has been to provide apparatus, as aforesaid, in which groups of receptacles may be easily and quickly interchanged in order to vary still further the kinds and characteristics of investigations being made during a single sequence of operation.

A further object of the invention has been to provide apparatus, as aforesaid, which will be relatively compact and, accordingly, requires a relatively small amount of floor space for its operation, thereby permitting its use in a small room, as a constant temperature room.

Further objects and purposes of the invention will be apparent to persons acquainted with methods and apparatus of this general type upon reading the following disclosure and inspecting the accompanying drawings, in which.

Figure 7A:
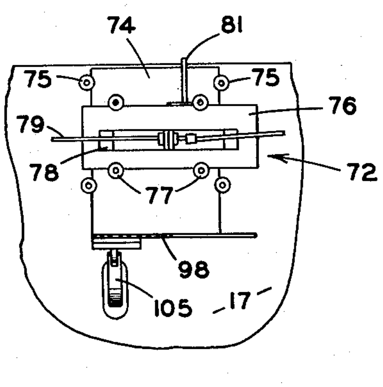
FIGURE 7 is a broken, top plan view of said apparatus, similar to that shown in FIGURE 6, but restricted to a disclosure of the mechanism for effecting a step-by-step, lateral movement of the racks along the front and rear walls of said conveyor compartment.
Figure 7:
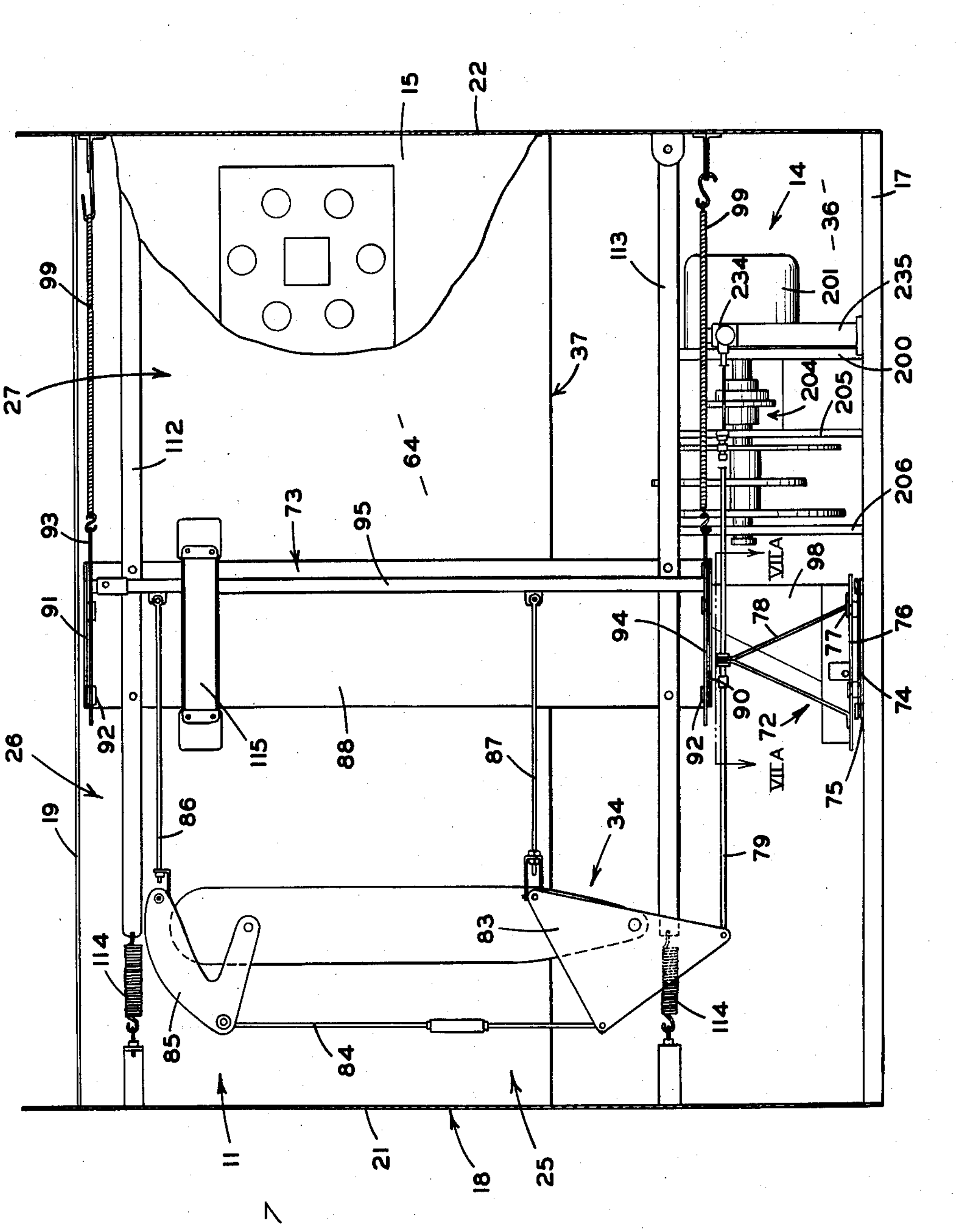

FIGURE 7*a* is a sectional view of FIGURE 7 taken along the line VIIA—VIIA and rotated 180°.

Figure 6:
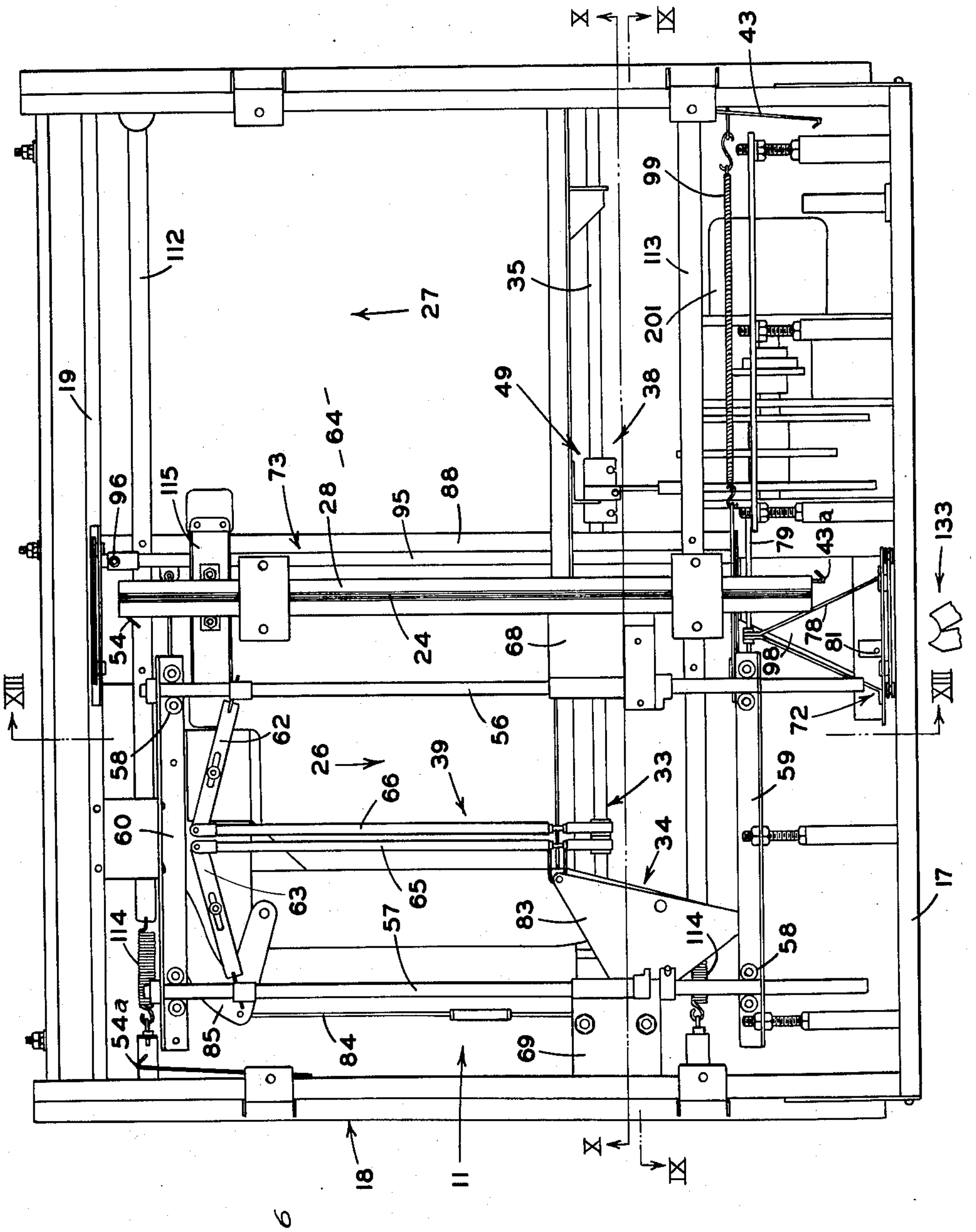
FIGURE 6 is a top plan view of said apparatus, with the racks, the rack ways, top brace bars and said recording head removed to disclose the mechanism in the rack conveying compartment.
Figure 8:
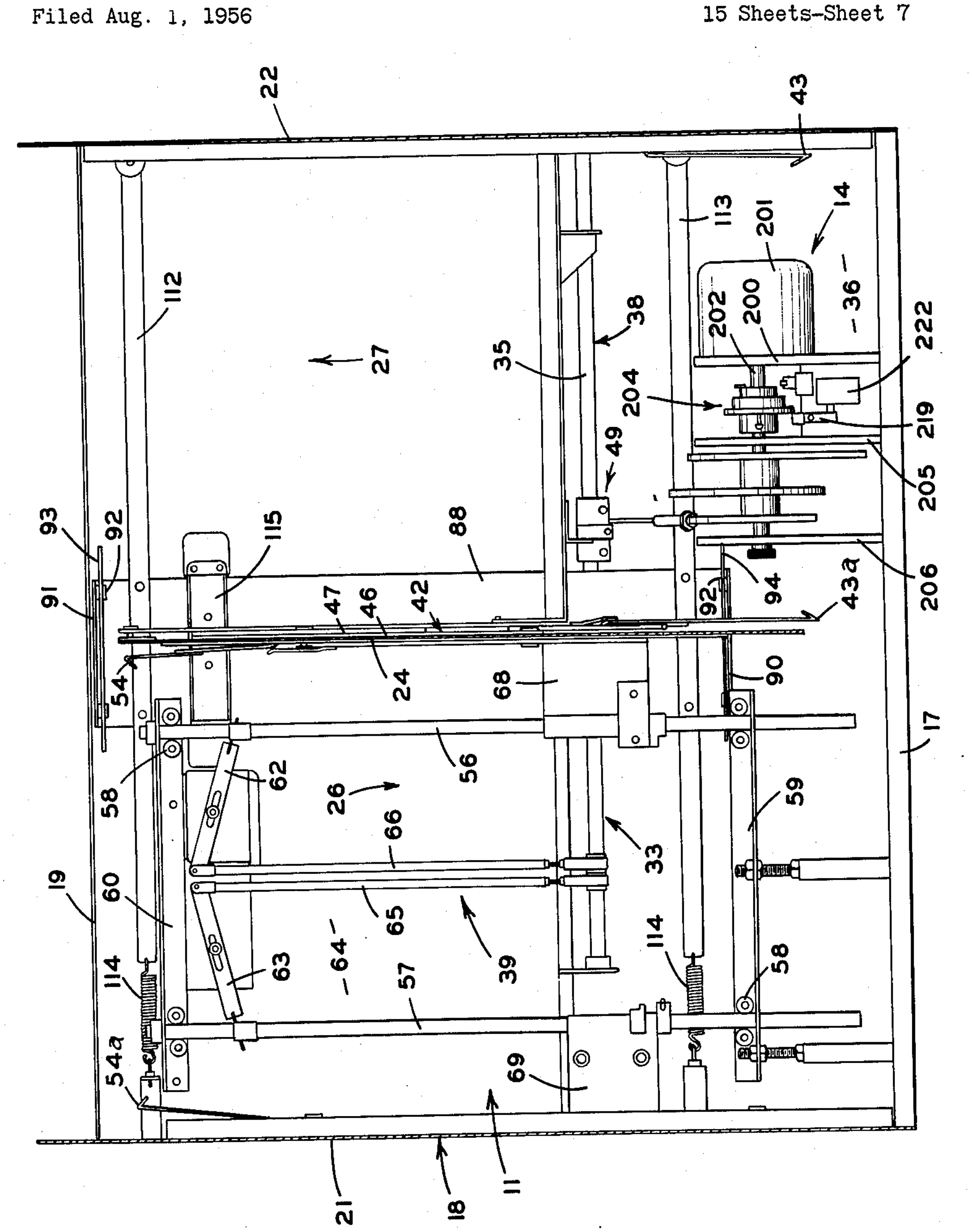

FIGURE 8 is a top plan view of said apparatus similar to that shown in FIGURE 6, but restricted to a disclosure of the mechanism for effecting forward and rearward movement of said racks between the front and rear walls of the conveyor compartment.

Figure 9:
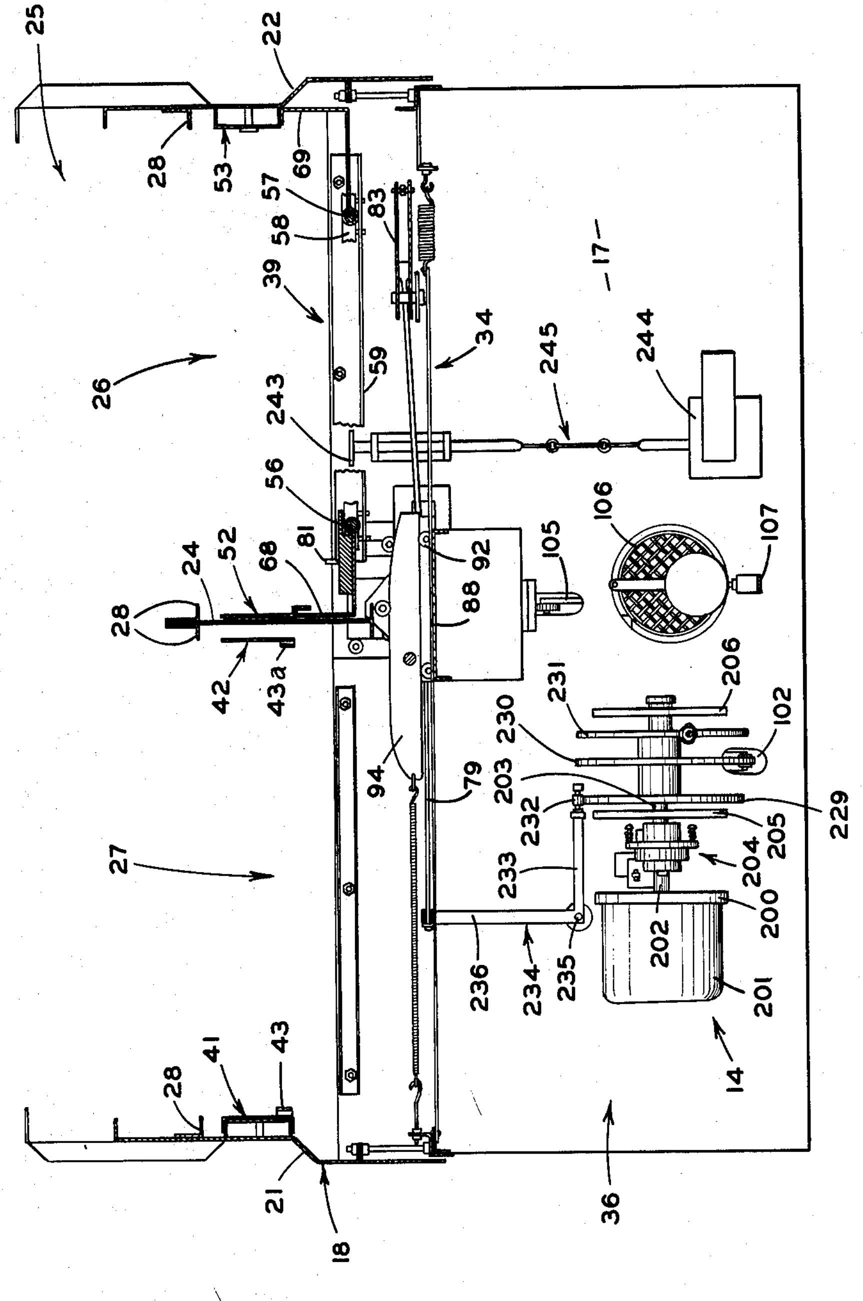

FIGURE 9 is a sectional view taken along the line IX—IX of FIGURE 6 and rotated 180°.

Figure 10:
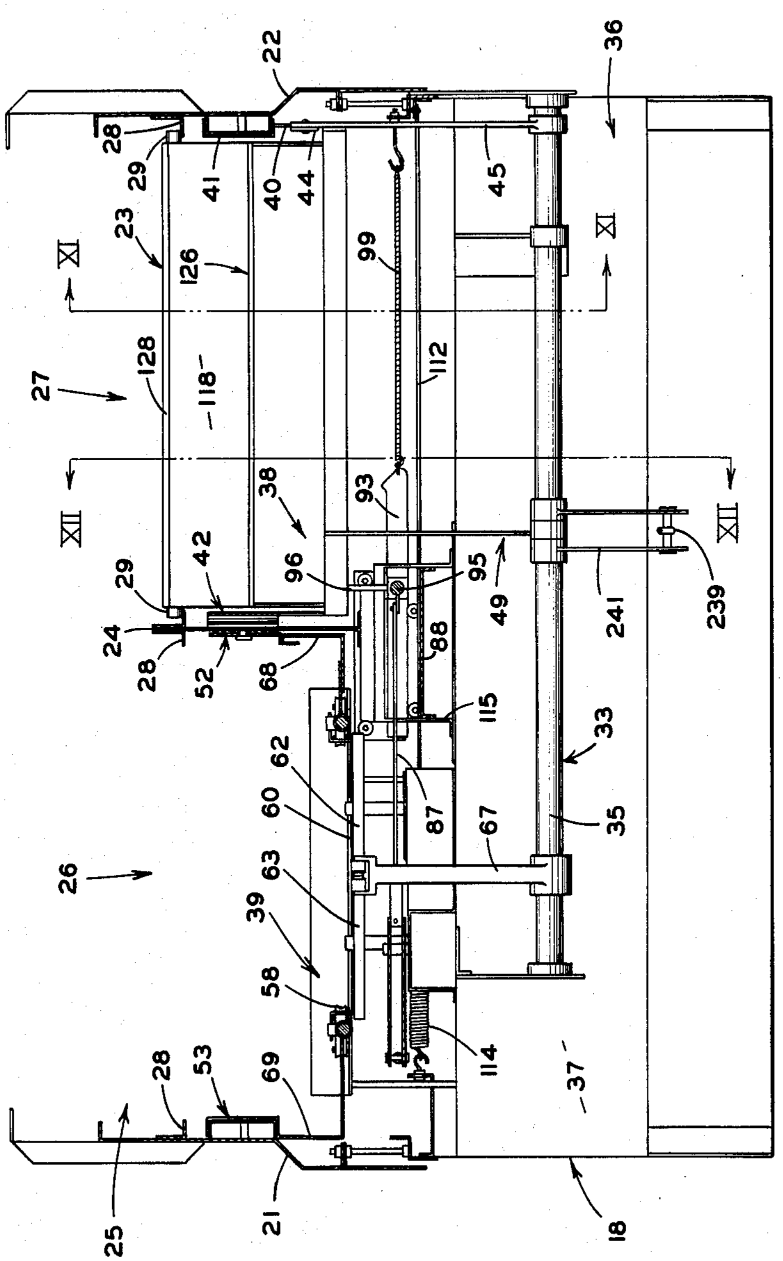

FIGURE 10 is a sectional view taken along the line X—X of FIGURE 6.

Figures 11, 12:
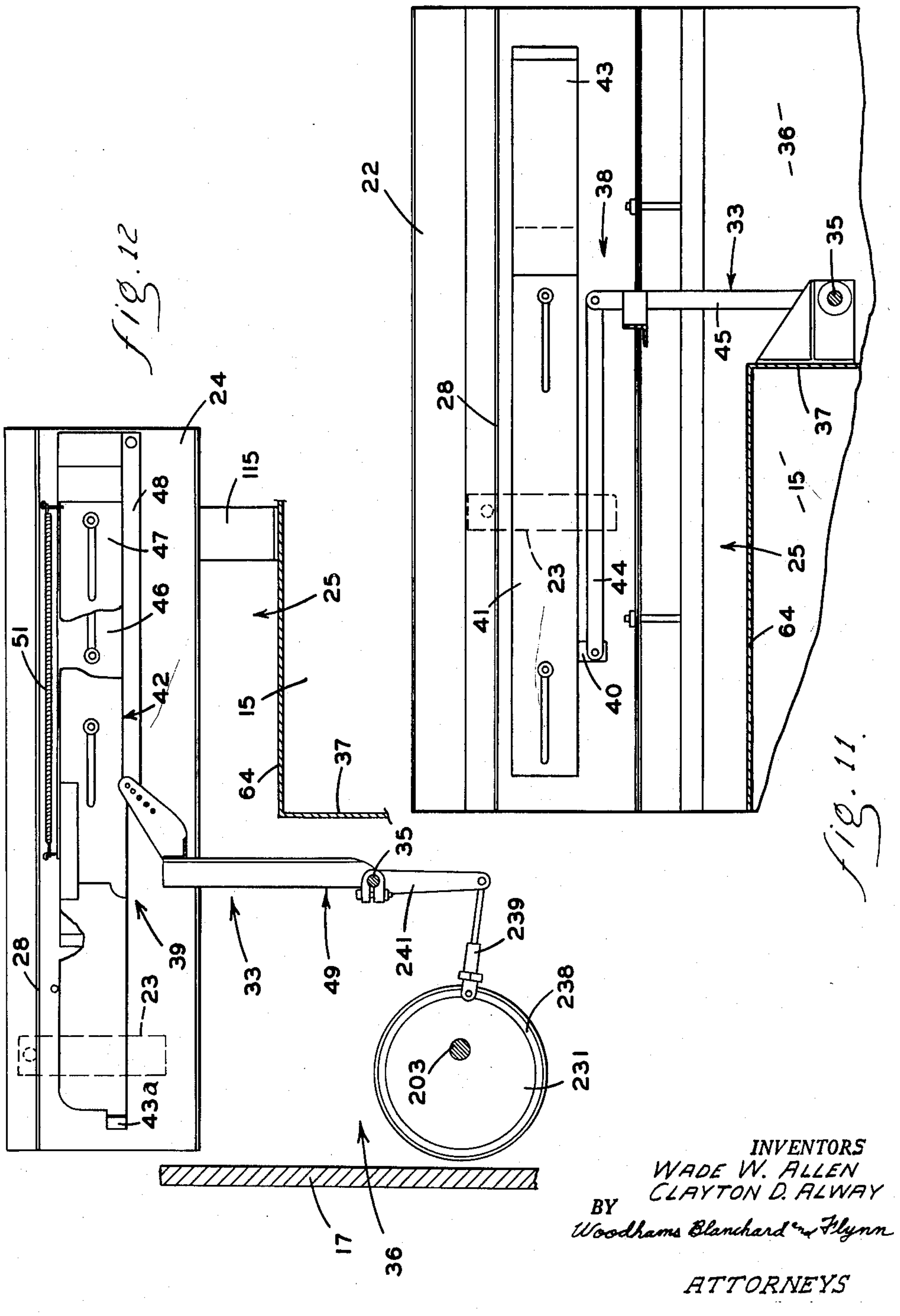

FIGURE 11 is a sectional view taken along the line XI—XI of FIGURE 10.

FIGURE 12 is a sectional view taken along the line XII—XII of FIGURE 10.

Figure 13:
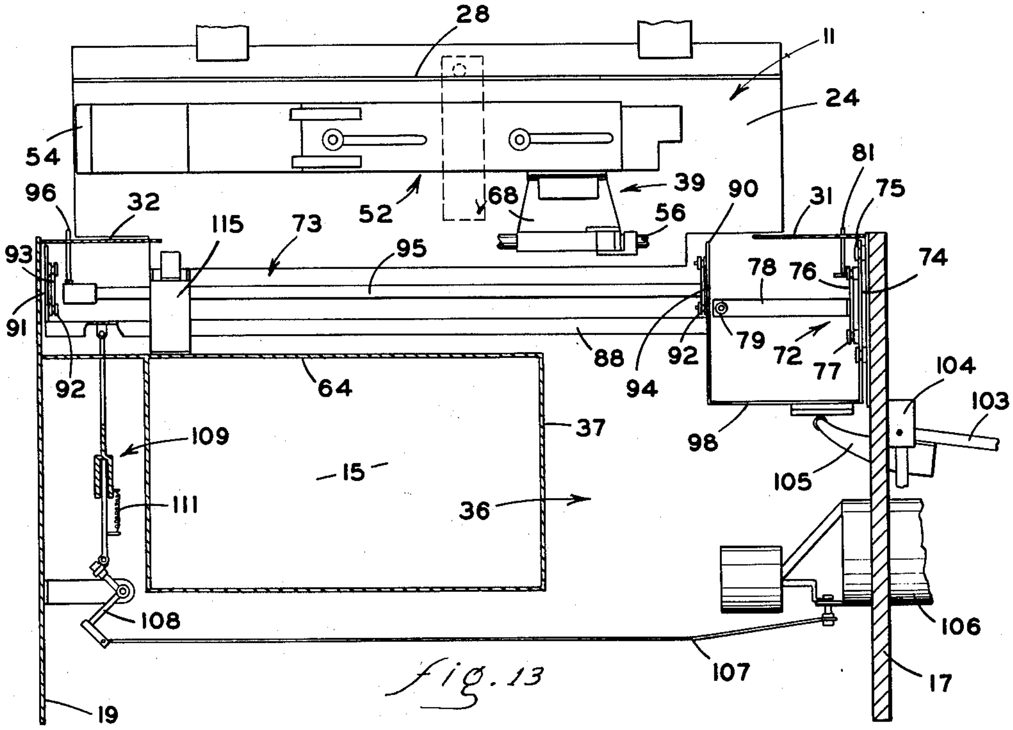

FIGURE 13 is a sectional view taken along the line XIII—XIII of FIGURE 6.

Figure 2:
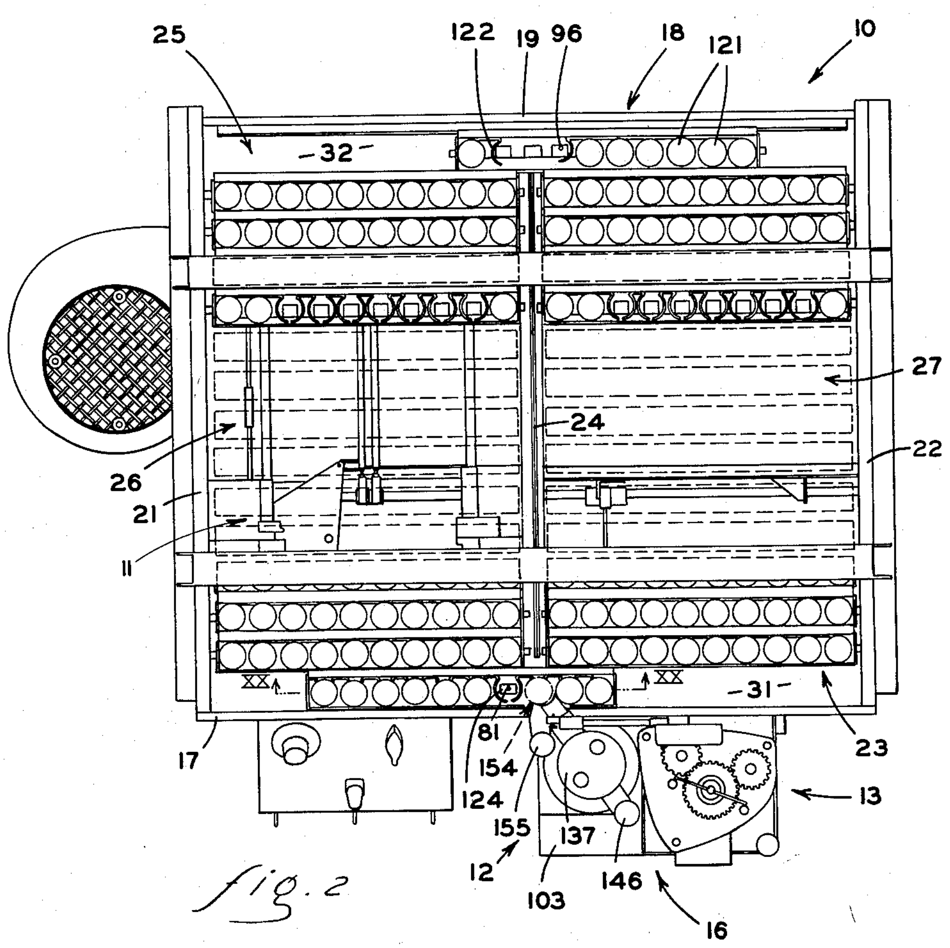
FIGURE 2 is a top plan view of said apparatus shown in FIGURE 1.
Figure 14:
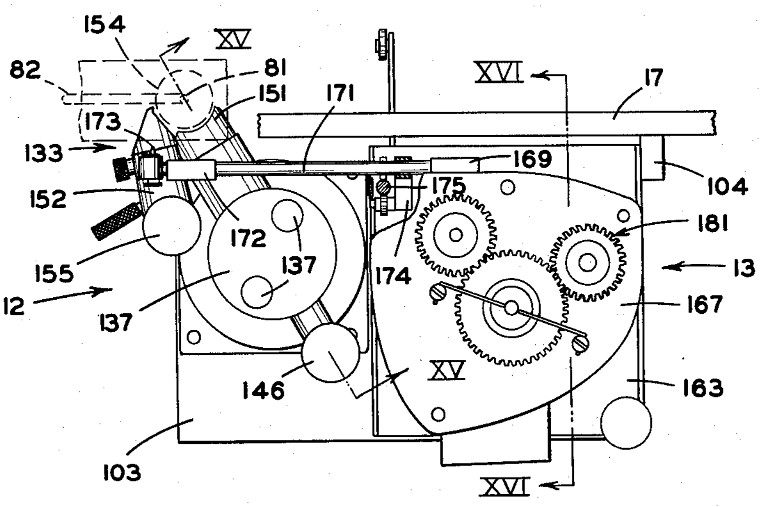

FIGURE 14 is an enlarged fragment of FIGURE 2, including the sensing and recording head and the adjacent portion of the conveyor mechanism.

Figure 15:
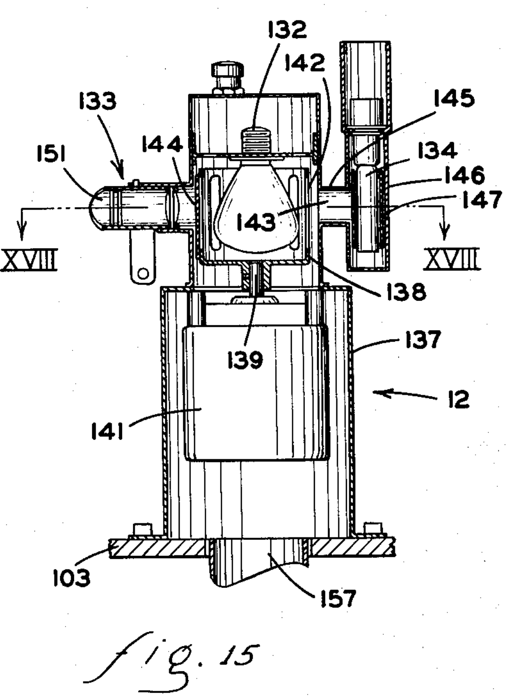

FIGURE 15 is a sectional view taken along the line XV—XV of FIGURE 14, and rotated about 60° counterclockwise.

Figure 16:
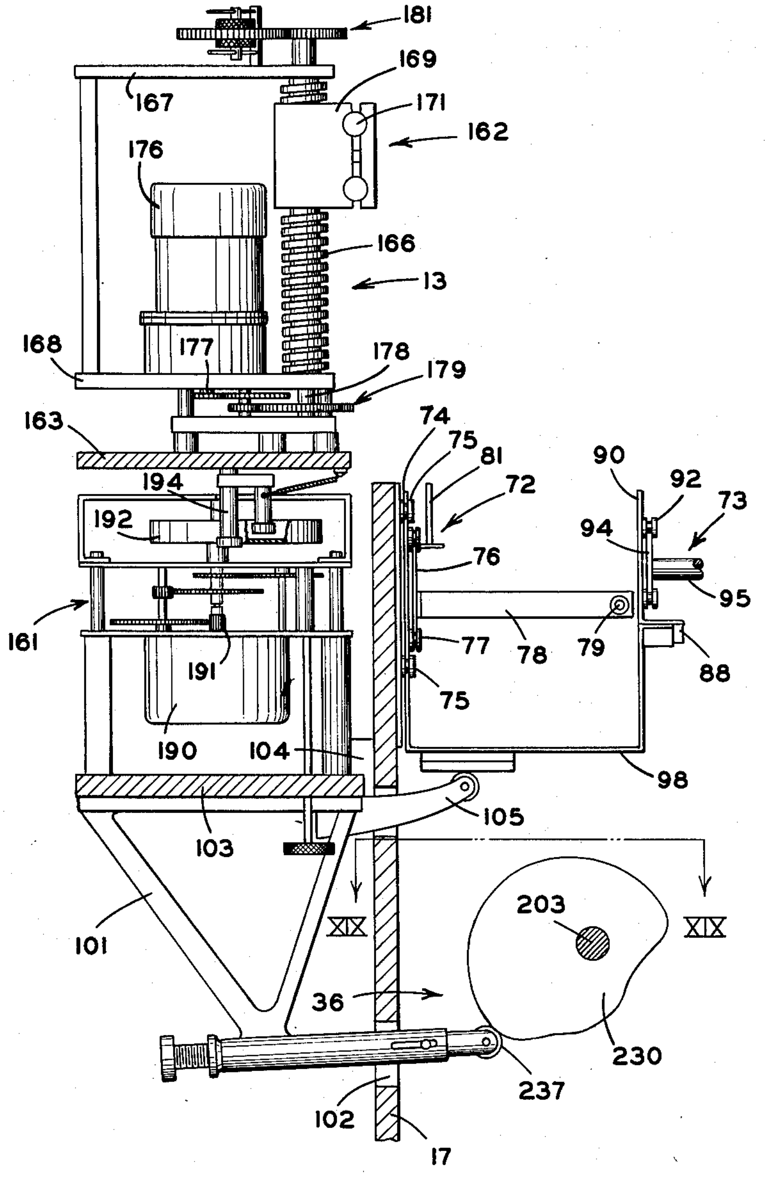

FIGURE 16 is a sectional view substantially as taken along the line XVI—XVI of FIGURE 14 and rotated 90° clockwise.

Figure 1:
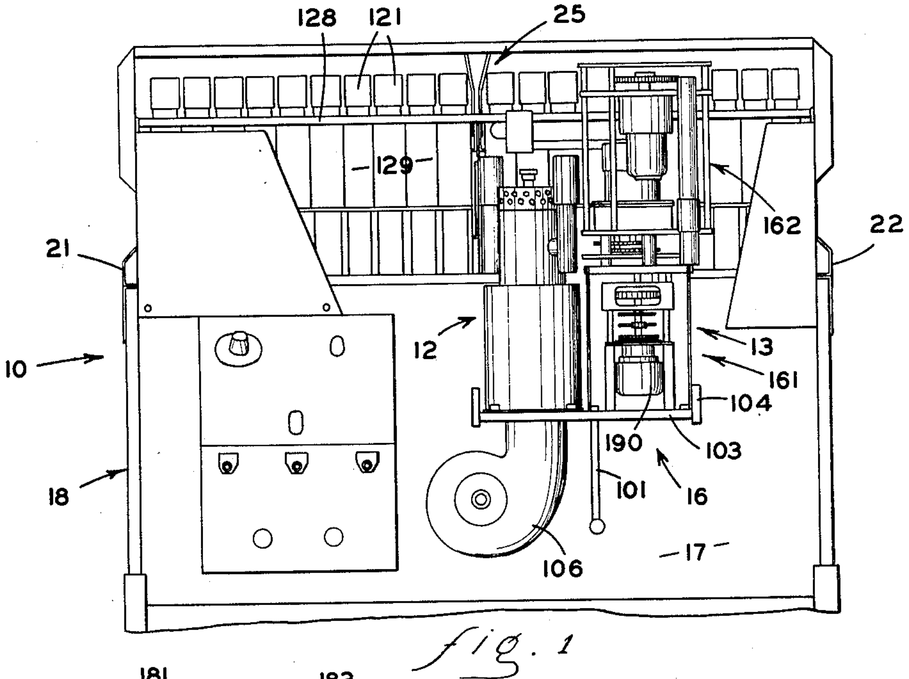
FIGURE 1 is a front elevation view of one form of the apparatus to which this invention relates, including the upper part of a stand for supporting same.
Figure 17:
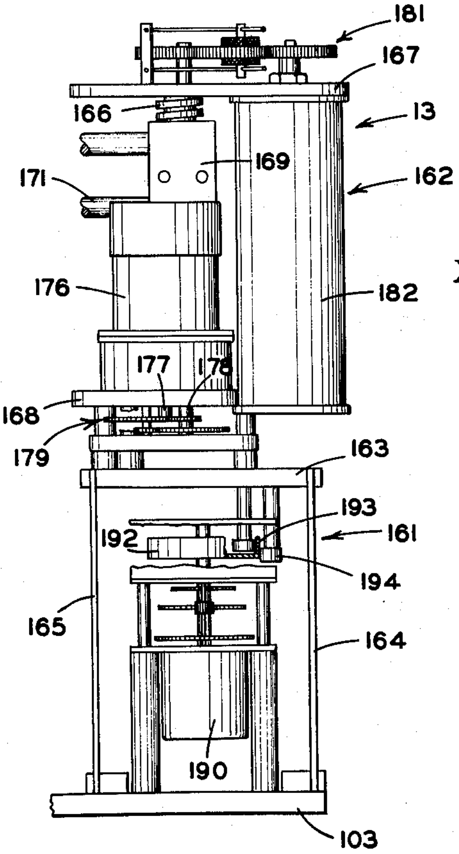

FIGURE 17 is an enlarged fragment of the sensing and recording head as appearing in FIGURE 1.

Figure 18:
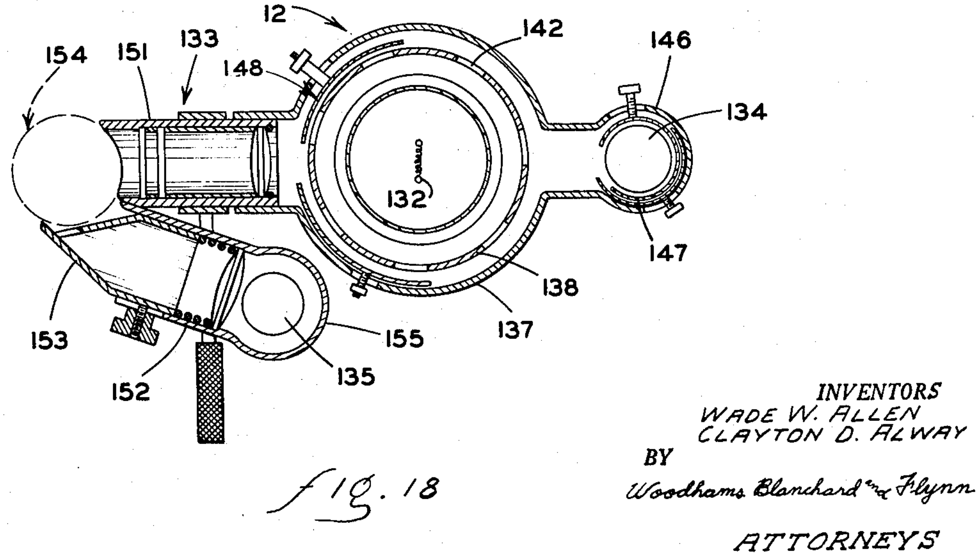

FIGURE 18 is a sectional view taken along the line XVIII—XVIII of FIGURE 15.

Figures 19, 19A:
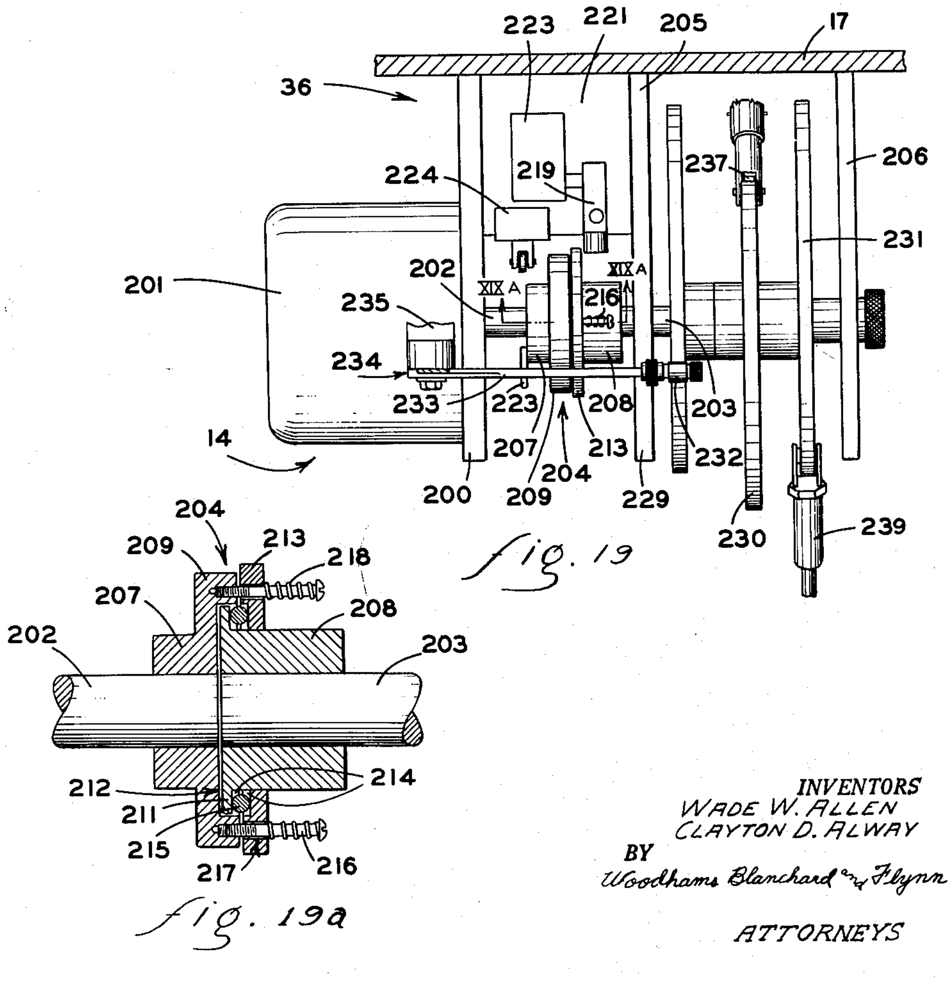

FIGURE 19 is a sectional view substantially as taken along the line XIX—XIX of FIGURE 16 and rotated 90° clockwise.

FIGURE 19*a* is a sectional view taken along the line XIXA—XIXA of FIGURE 19.

Figure 20:
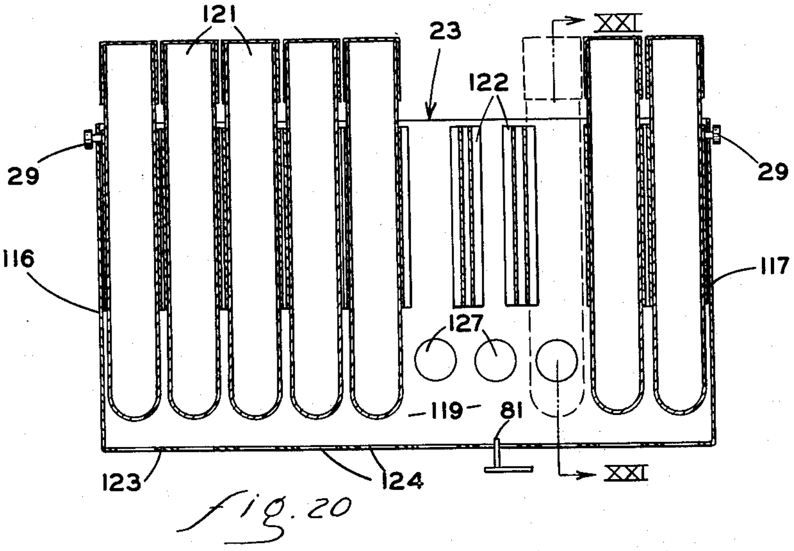

FIGURE 20 is a sectional view taken along the line XX—XX of FIGURE 2.

Figures 21, 22, 23, 24, 25, 26:
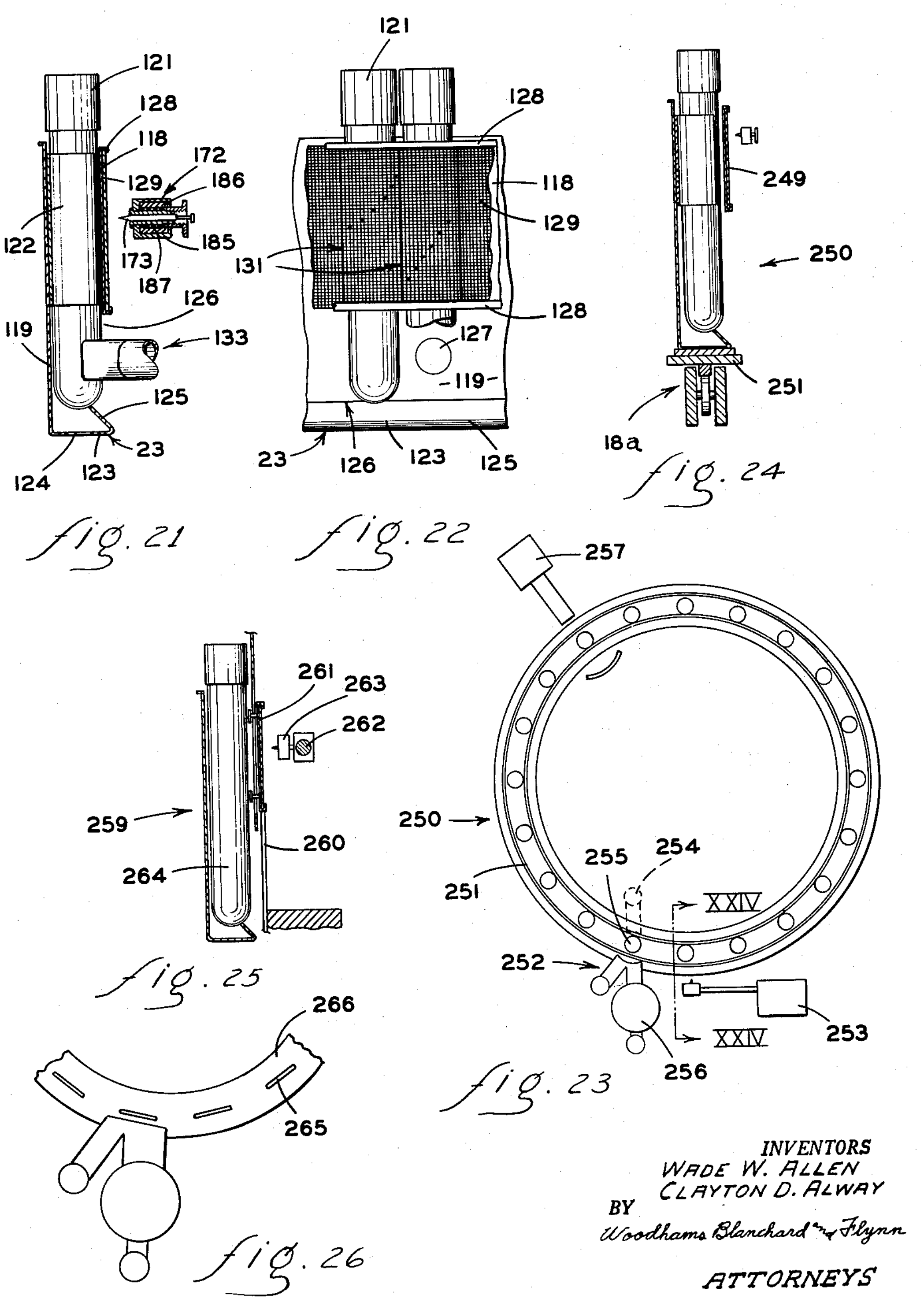

FIGURE 21 is a sectional view taken along the line XXI—XXI of FIGURE 20 and including part of the recording head.

FIGURE 22 is an enlarged fragment of FIGURE 1, showing the mark receiving member and part of the rack supporting it.

FIGURE 23 is a top plan view of an alternate form of apparatus characterized by the invention.

FIGURE 24 is a sectional view taken along the line XXIV—XXIV of FIGURE 23.

FIGURE 25 discloses an alternate mechanism for effecting constant movement of the rack receiving means with respect to the marking means.

FIGURE 26 is a fragment of a top plan view of structure embodying the substance of the invention and indicating a different possible use thereof.

Figure 27:
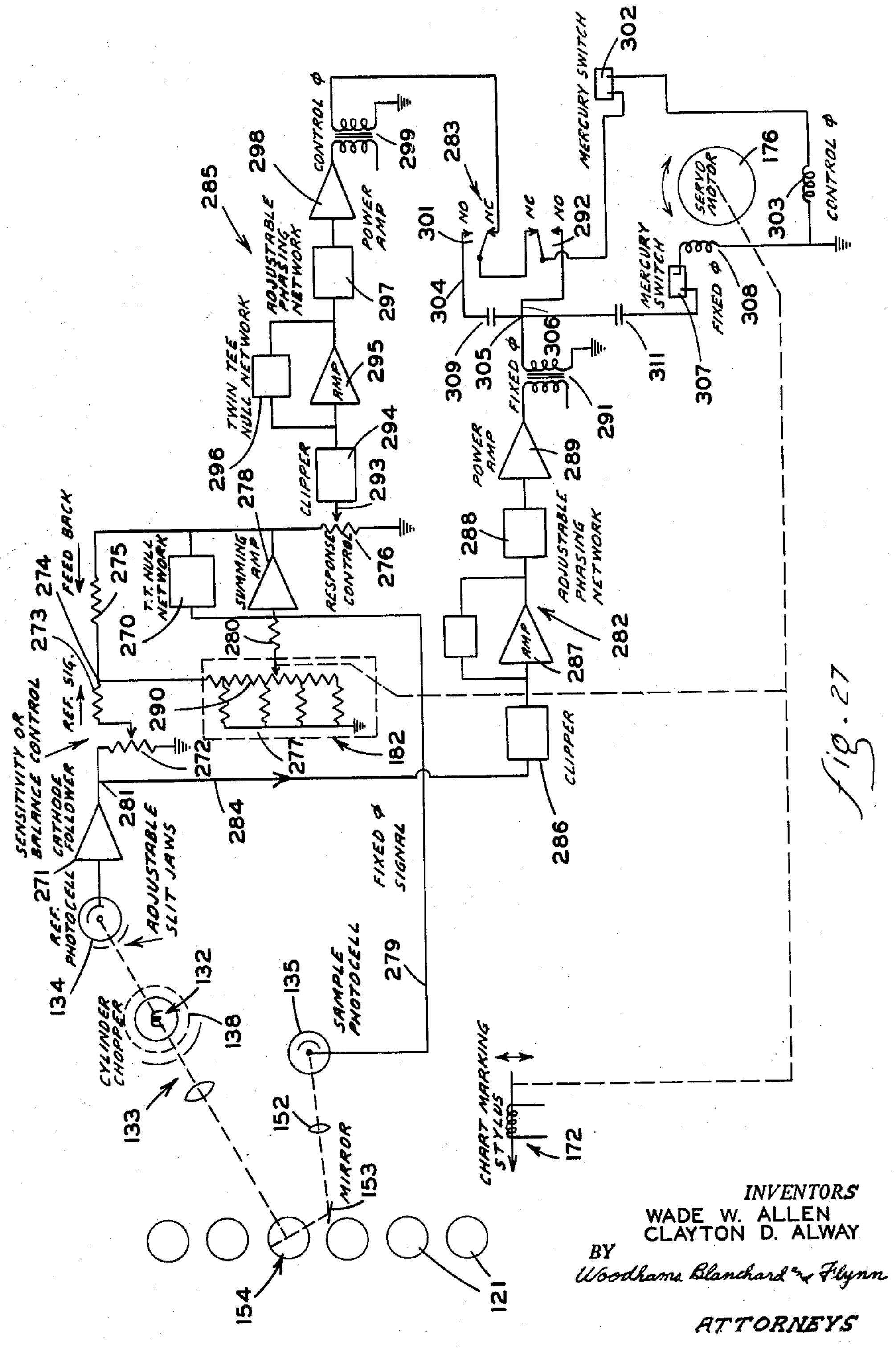

FIGURE 27 is a circuit diagram for the apparatus.

For the purpose of convenience in description, the terms "upper," "lower," "front," "rear," "left," "right," and derivatives thereof, will have reference to the apparatus as appearing in FIGURE 1. The terms "inner," "outer," and derivatives thereof, will have reference to the geometric center of said apparatus and parts thereof.

GENERAL DESCRIPTION

In general, the process of the invention consists of moving a plurality of receptacles or test units containing or including the specimens or samples whose changes are being observed stepwise through an observation station, each of the receptacles or test units being momentarily stopped at said station and subjected to suitable observation or examination. A record receiving member is carried in prearranged relationsip with respect to each receptacle or test unit. The results of the observation are transmitted to a recording device which moves in a first direction with respect to said record receiving member and then effects a recording on said record receiving member. The extent of such movement in said first direction is proportional to, and indicative of, the extent of the change which is observed. Simultaneously, the record receiving member and the recording means are caused to move relatively slowly with respect to each other in a second direction, making a relatively wide angle, usually perpendicular, to said first direction, so that the next recording applied to said record receiving member, as a result of the next observation of the same receptacle by said apparatus, will be displaced in said second direction from the first recording. Thus, movement of said recording device in said first direction along said record receiving member, such as a chart, will represent changes in the characteristic being measured within said receptacle, and movement in the second direction will represent the time at which the several observations were made.

The apparatus 10 (FIGURES 1 and 2) of the invention consists in one particular embodiment of a conveyor mechanism 11 supporting a plurality of racks 23 for stepwise movement through a predetermined, usually closed, path, each rack holding a plurality of containers. At a selected point in said path (or at a plurality of corresponding points where said path is not closed) suitable opto-electric means, such as the sensing mechanism 12, is utilized to examine the materials within each container for the characteristic being investigated and for producing an electrical potential which varies in proportion to changes in said characteristic. Said electrical potential is then utilized for moving a recording or marking instrument of a recording mechanism 13 along a line and positioning said instrument with respect to a record or mark receiving member. In said present embodiment, the mark receiving member is a card, suitably printed to provide a graph thereon, which card is mounted on each rack and has a portion thereof designated for, and closely adjacent to, each respective container within said rack. Further means are provided for effecting a slow, constant, relative movement of said card transversely of said line of movement of said marking instrument, thereby displacing successive readings of the apparatus with respect to each other in a predetermined direction and by a predetermined amount corresponding to, and indicating the extent of, the time intervals between successive readings.

A variety of supplementary and safety devices are also provided, such as a torque responsive, throw-out clutch for stopping the entire mechanism upon the occurrence of any kind of mechanical obstruction anywhere in the mechanism, means for filtering out the effect of stray or ambient radiations, such as room illumination, means for protecting the apparatus from damage by overrunning of the marker control mechanism, and various other subsidiary features desirable for producing an apparatus fully capable of carrying out the objects and purposes above set forth.

DETAILED DESCRIPTION

Figure 3:
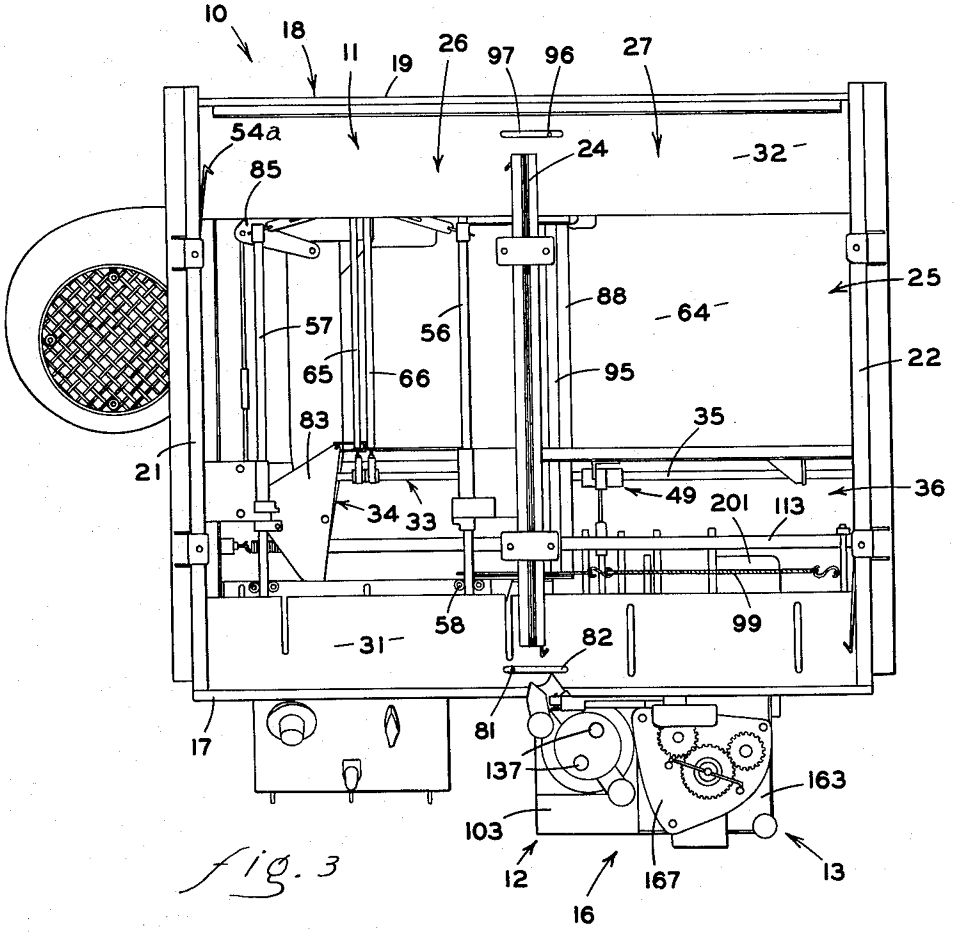
FIGURE 3 is a top plan view of said apparatus shown in FIGURE 1, with the container carrying racks removed therefrom.

The apparatus 10 (FIGURES 1, 2 and 3) which is illustrative of the invention, will be described for convenience in terms of four component parts. These parts comprise the conveyor mechanism 11 (FIGURES 3, 6, 7, 8, and 13), a sensing mechanism 12 (FIGURES 4, 14, 15 and 18), a recording mechanism 13 (FIGURES 4, 5, 14, 16 and 17) and a drive mechanism 14 (FIGURES 7, 9 and 19). Parts of said conveyor, sensing, recording and drive mechanisms are interconnected, and/or operably controlled, by electrical and electronic mechanism including the circuitry disclosed in FIGURE 27, a substantial part of which mechanism may be separately contained in an electronic compartment 15 (FIGURES 7 and 13) beneath the conveyor mechanism 11. For reasons appearing hereinafter, the sensing mechanism 12 and the recording mechanism 13 are substantially and advantageously combined in a single unit referred to as the "sensing and recording head" or the "measuring head" 16, which is pivotally mounted upon the front wall 17 of the frame 18 surrounding and supporting the conveyor mechanism 11 and the electronic compartment 15.

A. *Conveyor Mechanism*

Referring to FIGURES 2, 3, 6, 7 and 8, it will be seen that the conveyor mechanism 11 is supported upon a substantially rectangular frame 18, which includes the front wall 17, a rear wall 19, and a pair of side walls 21 and 22. The conveyor mechanism 11 is designed and arranged to move a plurality of sample supporting racks 23 (FIGURES 20, 21 and 22) through a closed, substantially horizontal path within the conveyor compartment 25, which is defined by the walls of the frame 18. A center wall 24 is parallel with, and equidistant from, the side walls 21 and 22, is spaced from the front wall 17 and rear wall 19, and is within the said closed path traversed by the racks 23. Said center wall 24 also divides said conveyor compartment 25 into leftward and rightward chambers 26 and 27, respectively.

The racks 23 are moved rearwardly within the rightward chamber 27 and forwardly within the leftward chamber 26 by the mechanism 33 (FIGURE 8) which is disclosed in detail hereinafter. Mechanism 34 (FIGURES 6 and 7) effects step-by-step, transverse movement of said racks 23 within the compartment 25 adjacent to both the front and rear walls thereof. The movement of said racks adjacent to the front wall 17 is from left to right, and adjacent to the rear wall 19 is from right to left, thereby completing the conveyor path. Said transfer mechanism 34 will also be described in detail hereinafter.

The chambers 26 and 27 (FIGURE 2) are both arranged to receive an equal number of racks 23, which are disposed snugly, but removably, adjacent to each other between said front wall 17 and said rear wall 19. However, in order to permit proper operation of the apparatus 10, as discussed below, each chamber will normally contain one less than its full complement of racks.

The opposing surfaces of the center wall 24 (FIGURE 10) and the side walls 21 and 22 are provided with horizontal tracks 28, which are engageable by rollers 29 mounted upon the opposite ends of said racks 23 for supporting said racks as they are moved rearwardly within the right chamber 27 and forwardly within the left chamber 26. Substantially horizontal and co-planar rack ways 31 and 32 (FIGURE 3), respectively, extend transversely of the conveyor compartment 25 adjacent to the front and rear walls thereof for receiving and supporting the racks 23, which are moved transversely of said compartment 25 between said chambers thereof. The mechanism 34 effecting transverse movement of the racks 23 between the chambers 26 and 27, respectively, is substantially independent of, but coordinated with, the mechanism 33 effecting the forward and rearward movement of said racks 23. Thus, attention will first be directed to the forward and rearward mechanism 33, and will then be directed to the transverse mechanism 34.

B. *Forward and Rearward Mechanism*

As shown in FIGURES 8, 10, 11, and 12, the mechanism 33 for effecting forward and rearward movement of the racks 23 is comprised of right and left assemblies 38 and 39, respectively, which are both connected to a rocker shaft 35 (FIGURES 10, 11 and 12). Said shaft 35 is pivotally mounted within the drive compartment 36 upon the front wall 37 of the electronic compartment 15, and is disposed transversely of, and beneath, the conveyor compartment 25. The right assembly 38 and the left assembly 39 are disposed within the right and left chambers, respectively.

The right assembly 38 (FIGURES 8, 10, 11 and 12) is comprised of a pair of elongated, substantially parallel, rack engaging elements 41 and 42 horizontally, slidably mounted upon the opposing faces of the right side wall 22 and the center wall 24 below the tracks 28. Said rack engaging elements 41 and 42 have rack hooks 43 and *43a* supported upon their forward ends for engaging the opposite ends of a rack 23 disposed upon the front rack way 31 adjacent to the front wall 17 and between planes defined by the right side wall 22 and said center wall 24. The right hook 43 (FIGURES 8 and 11) is preferably fabricated so that it will flex rightwardly under the urging of a rack 23 to ensure a positive engagement therebetween. A link 44 is pivotally secured at one end to a bracket 40 depending from right rack-engaging element 41. The other end of the link 44 is pivotally secured to a crank 45 mounted upon the rocker shaft 35.

The rack element 42 (FIGURE 12) has a pair of parallel, overlapping segments 46 and 47. The inner segment 46 is slidably supported upon the outer segment 47 for limited movement with respect thereto. Resilient means, such as the spring 51, is connected between said segments 46 and 47 for resiliently resisting rearward movement of the inner segment 46 with respect to the outer segment 47. A link 48 is pivotally secured at one end to the rear end of the outer segment 47, and its other end is pivotally secured to a crank device 49 mounted upon the rocker shaft 35. Thus, rotational movement of the rocker shaft 35 (FIGURES 11 and 12), operating through the cranks 45 and 49 and the links 44 and 48, respectively, effects substantially simultaneous forward or rearward movement of the rack engaging elements 41 and 42. The lost motion connection between the segments 46 and 47 permits the outer segment 47 to move forwardly without moving the segment 46 therewith. Thus, when a rack 23 is disposed between the front wall 17 and the forward end of the rack hook **43*a*, which is mounted on the segment 46, forward movement of the segment 47, urged by the linkage between it and the rocker shaft 35, will not jamb the rack engaging element 42. This lost motion device is not required on the right rack engaging element 41 (FIGURE 11) since a rack 23 cannot physically come between the hook 43 on the element 41 and the adjacent portion of the front wall 17. The opposing surfaces of the rack hooks 43 and 43*a* are sloped to provide cammed surfaces which, when the rack elements 41 and 42 are moved forwardly, will slide past the adjacent ends of a rack disposed in engaging position at the front end of chamber 27**.

The left assembly 39 of the forward and rearward mechanism 33 (FIGURES 8, 10 and 13) is comprised of left and right rack engaging elements 52 and 53 which are slidably mounted upon the opposing faces of the left side wall 21 and the center wall 24 of the conveyor compartment 25, respectively, below the tracks 28 and in a manner substantially similar to the mounting of the rack elements 41 and 42. However, the rack elements 52 and 53 have their rack hooks 54 and **54*a* at the rearward ends thereof for engaging, and moving forwardly, a rack 23 disposed upon the rear rack way 32 at the rear end of chamber 26. The rack-engaging element 52, like the rack-engaging element 42, has a lost motion mechanism similar to, and for the same reasons as, the lost motion mechanism provided by the segments 46 and 47 of the element 42**.

Because the rack elements 52 and 53 are arranged to move the racks in a direction which is opposite to the direction which they are moved by rack elements 41 and 42, means is necessary for reversing the motion effected by the rocker shaft 35. This is accomplished by connecting the rack elements 52 and 53 to a pair of parallel, substantially horizontal rods 56 and 57 (FIGURE 8), respectively, which are axially reciprocably supported within the left chamber 26 by means of pulleys 58 mounted upon brackets 59 and 60, which are supported upon the frame 18 adjacent to the front and rear walls, repectively. The rods 56 and 57 are secured to said rack elements 52 and 53, respectively, by the brackets 68 and 69.

A pair of arms 62 and 63 (FIGURE 8) are pivotally mounted upon the upper wall 64 of the electronic compartment 15, between the rods 56 and 57, for pivotal movement about substantially vertical and parallel axes disposed between their respective ends. One end of each of said pivot arms 62 and 63 is secured, respectively, to the rods 56 and 57 and the other end of each of said pivot arms 62 and 63 is pivotally secured, respectively, to the corresponding pair of links 65 and 66. The other ends of said links are pivotally secured to a crank 67 (FIGURE 10) mounted upon, and operable with, the rocker shaft 35. Thus, movement of the links 65 and 66 in one direction is translated by the pivot arms 62 and 63 into movement of the rods 56 and 57, hence the rack elements 52 and 53, respectively, in the opposite direction. Since both the right and left assemblies 38 and 39 of the forward and rearward mechanism 33 are connected to, and operable by, the rocker shaft 35, the operation of the two assemblies is substantially simultaneous. Thus, when there is a full load of racks 23 upon the conveyor mechanism 11 (FIGURE 2), a rack 23 will be moved forwardly by the assembly 39 each time a rack is moved rearwardly by the assembly 38.

C. *Transverse Mechanism*

The transverse mechanism 34 (FIGURES 7, 9, 10 and 13) includes a front carriage 72 and a rear carriage 73, disposed within said conveyor compartment 25 approximately midway between the side walls 21 and 22 thereof, and linkage mean for effecting contrary, simultaneous, transverse movement of said carriages. The front carriage 72 (FIGURES 7, 7*a* and 13) has an outer vertical plate 74 vertically, reciprocably supported upon the inner surface of the front wall 17 by means of the rollers 75 just below the front rack way 31. An inner vertical plate 76 is horizontally reciprocably supported upon the vertical plate 74 by rollers 77. The inner plate 76 is connected by the bracket 78 to a rod 79 between the ends thereof, said rod being disposed substantially parallel with the rocker shaft 35. The rod 79 is engaged at its right end, and actuated, by means disclosed hereinafter for effecting horizontal, transverse movement of the inner plate 76 with respect to the outer plate 74 and the conveyor compartment 25. A front shift pin 81 is adjustably supported upon the upper portion of the inner plate 76 and is extendable through a slot 82 (FIGURE 3) in the front rack way 31. Said slot, which extends transversely of the compartment 25, is sufficiently long to permit unrestricted, transverse movement of the pin 81, hence of the inner plate 76. Said slot is also located so that it will be under a rack 23 being moved transversely of said compartment 25 adjacent to the front wall thereof.

The leftward end of the link rod 79 (FIGURE 7) is pivotally connected to one corner of a horizontal, triangular plate 83 pivotally supported upon the upper wall 64 of the electronic compartment 15. Another corner of said pivot plate 83 is pivotally secured to one end of a tie rod 84, whose other end is pivotally secured to the apex of a horizontal, V-shaped, pivot plate 85, which is also pivotally supported upon the upper wall 64. The third corner of the triangular pivot plate 83 and a corresponding point on the pivot plate 85 are adjustably and pivotally secured, respectively, to the left ends of a pair of substantially parallel link bars 86 and 87, which bars are pivotally connected at their right ends to the beam 95 of the rear carriage 73.

The rear carriage 73 (FIGURES 7 and 13) is mounted upon an elongated base member 88, which extends rearwardly from a point near the rod 79 to a point near the rear wall 19, and is horizontally disposed just above the upper wall 64 of the electronic compartment 15. The front end of the base member 88 is secured, as by means of the connecting bracket 98, to the outer vertical plate 74 of the front carriage 92. The base member 88 has a pair of upwardly extending flanges 90 and 91 at the front and rear ends thereof, respectively, upon the opposing faces of which a pair of transverse plates 93 and 94 are respectively supported, as by means of the rollers 92. Said plates are connected by a beam 95, which is part of said rear carriage, and are, therefore, simultaneously movable in a horizontal direction transverse of the base member 88. A rear shift pin 96 is adjustably mounted upon the beam 95 adjacent to the rear transverse plate 93, and is extendable upwardly through a pin slot 97 (FIGURE 3) in the rear rack way 32, which slot runs lengthwise thereof. The pin slot 97 is arranged to permit engagement between the pin 96 and a rack 23 disposed adjacent to the rear wall 19.

Rightward movement of the link rod 79 (FIGURE 7), hence of the front shift pin 81 connected thereto through the inner vertical plate 76 and the bracket 78, will result in a simultaneous leftward movement of the beam 95, hence of the rear shift pin 96 connected thereto. A pair of springs 99 are connected between the transverse plates 93 and 94, respectively, and the right side wall 22 of the compartment 25 for resisting leftward movement of the beam 95, hence of the rear shift pin 96, and, therefore, also resisting rightward movement of the front shift pin 81 linked therewith, as recited above.

Figure 5:
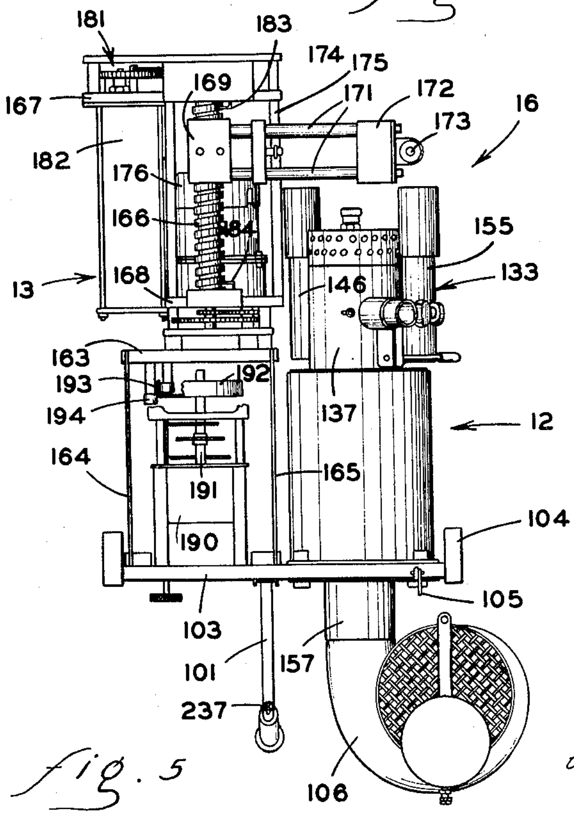
FIGURE 5 is a rear view of said sensing and recording head, detached from the remainder of said apparatus.
Figure 4:
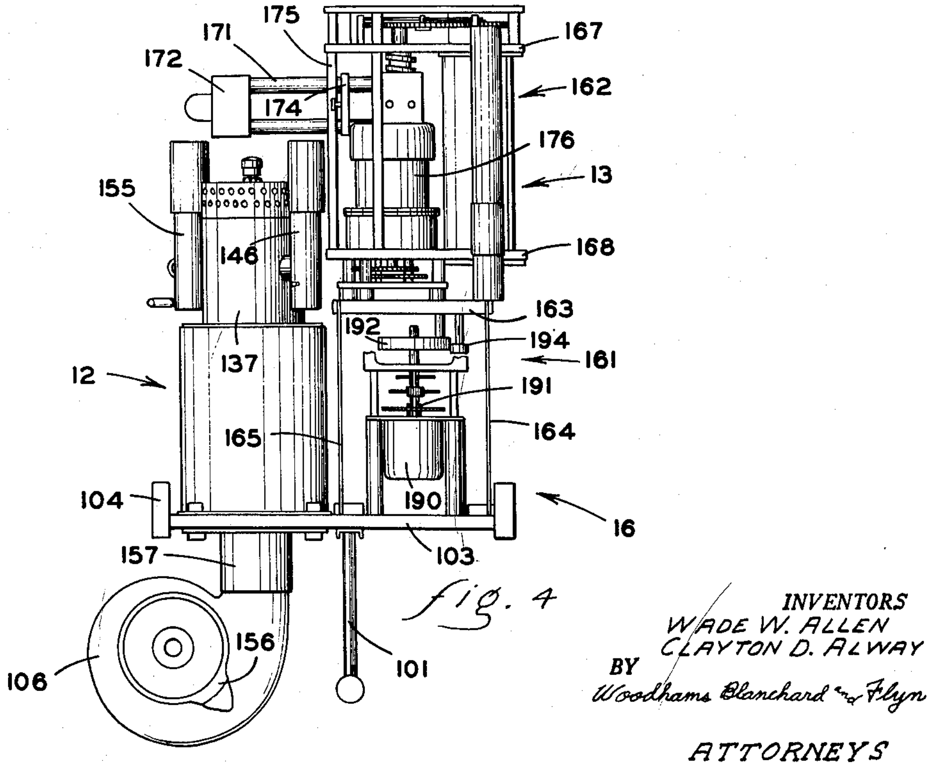
FIGURE 4 is a front view of a portion of said apparatus, including the sensing and recording head.

Having described the structure whereby the front and rear shift pins are moved transversely of the conveyor compartment 25, consideration is now directed to the structure by which said shift pins are actuated in a vertical direction. As shown in FIGURES 4 and 5, the measuring head 16 has a base platform 103, which is pivotally suported by bearings 104 mounted upon the front surface of the front wall 17 for pivoting said platform about a substantially horizontal axis. A lift arm 105, which is secured to the platform 103, extends through an appropriate opening in the front wall 17 of the frame 18 (FIGURES 9 and 13) for engagement with the lower surface of the connecting bracket 98. Thus, when the sensing head 16 is pivoted away from the front wall 17, the lift arm 105 will raise the outer vertical plate 74, to which the connecting bracket 98 is secured, thereby raising the front shift pin 81 and the front end of the base member 88, to which said bracket 98 is also secured. When the sensing head 16 is pivoted toward the front wall 17, the outer plate 74 and front shift pin 81 are free to move back downwardly.

An exhaust housing 106 (FIGURES 9 and 13) is secured to, and suspended from, the base platform 103 and, therefore, is pivotally movable therewith. Said housing 106, which extends through an appropriate opening in the front wall 17 of the frame 18, has its inner end pivotally connected to the front end of a link rod 107, which extends to the rear wall 19 beneath the electronic compartment 15. The rear end of the link rod 107 is pivotally connected to a crank 108, which is in turn pivotally supported upon the rear wall 19 of the frame 18. Said crank 108 is pivotally secured to the lower end of linkage 109, which is pivotally connected at its upper end to the rear end of the base member 88. Thus, movement of the measuring head 16 away from the front wall 17 provduces a movement of the exhaust housing 106 into the frame 18, which, operating through the link rod 107, the crank 108, and the linkage 109, effects a raising of the rear end of the base member 88, thereby raising the rear shift pin 96. Pivotal movement of the measuring head 16 toward the front wall 17 produces the reverse movements of the parts just recited, thereby permitting the rear shift pin 96 to move downwardly again.

The linkage 109 (FIGURE 13) is advantageously provided with expansible means, including the spring 111, whereby the crank 108 and associated parts are able to move with the link rod 107, even though the member 88 or the rear carriage 73 are unable to move downwardly therewith. A pair of substantially parallel, transverse straps 112 and 113 are secured to the upper surface of the base member 88 near its front and rear ends, respectively, and extends transversely of the conveyor compartment 25. One end of each strap is secured to the right side wall 22 and the other end of each strap is connected to the left side wall 21 through resilient means, such as springs 114. The straps 112 and 113 combine with the springs 114 to resist upward movement of the base member 88, hence, of the rear carriage 73. Because said member 88 is connected to said front carriage 72 by means of the connecting bracket 98, the straps 112 and 113 also resist upward movement of said front carriage 72. A guide bracket 115, supported upon the upper wall 64 of the electronic compartment 15, guides the upward and downward movement of the base member 88.

Accordingly, pivotal movement of the sensing head 16 away from the front wall 17 will effect an upward movement of the front and rear shift pins 81 and 96 and reverse movement of said head 16 will permit said straps 112 and 113 to urge the shift pins downwardly. Reciprocation of the link rod 79 will effect contrary reciprocations of the said front and rear shift pins. The linkage involved in effecting movement of said front and rear shift pins is so arranged that said shift pins will simulaneously describe substantially identical and parallel, rectangular patterns of movement in contrary or counterclockwise directions, as viewing such movements from the front or rear of the apparatus, respectively.

A bracket 101 (FIGURE 16) is secured to the lower surface of the base platform 103 and has an arm which extends through an appropriate opening 102 in the front wall 17 for actuation, by means described hereinafter, to effect said pivoting of the sensing and recording head 16 about the axis of the bearings 104.

*D. Container Racks*

The racks 23 (FIGURES 20 and 21), which may be fabricated from any convenient material and in any convenient shape, are herein disclosed, for illustrative purposes, as being substantially rectangular in shape. Said racks 23 have end walls 116 and 117, upon which the rollers 29 are rotatably supported near the upper ends thereof. The distance between the outside surfaces of said end walls 116 and 117 is, therefore, preferably only slightly less than the distance between the opposing surfaces of the center wall 24 and either one of the side walls 21 and 22 of the frame 11, which walls define the sections 26 and 27 of the conveyor compartment 25. The racks 23 have front and rear walls 118 and 119, which are preferably parallel and spaced from each other a distance slightly greater than the outside dimension of the sample containers 121, such as test tubes, which are supported in the racks 23. Means, such as the spring clips 122, are mounted upon the inner surface of the rack rear wall 119 at uniform, spaced intervals transversely thereof for resiliently holding the sample containers 121 in specified, predetermined relationship with respect to the rack 23. The bottom wall 123 is provided with a plurality of uniformly spaced shift pin openings 124 into which the shift pins 81 and 96 are freely and slidably receivable. A flange 125 extends upwardly from the bottom wall 123 to support the sample containers 121 and prevent their interference with said shift pins. In this particular embodiment of the invention, one shift pin opening 124 is provided for each sample container 121, which the rack 23 is designed to hold.

The function of the shift pin openings 124 in the bottom wall 123 and the shift pins 81 and 96 is to effect a step-by-step, transverse movement of the racks 23 across the conveyor compartment 25. Thus, it becomes apparent that the spacing between the shift pin openings 124 must be coordinated with the transverse stroke of the shift pins 81 and 96. It also becomes apparent that the shift pin openings and shift pins must be arranged so that they can move a rack, located adjacent to either the front or rear wall of the compartment 25, from one of said chambers 26 and 27 to the other, into a position for forward or rearward movement, respectively, within said chambers by the forward and rearward mechanism 33.

The front wall 118 (FIGURES 21 and 22) of each rack 23 is spaced upwardly from the bottom wall 123 to provide an examination opening 126, which extends the length of each said rack 23 for purposes appearing hereinafter. The rear wall 119 of said rack 23 is provided with a plurality of circular openings 127, which are visible through the extended opening 126 in front wall 118, and are disposed, one each, directly behind each position for a said sample container 121 within the rack 23. The openings 127 are of such diameter that they prevent energy from being reflected off the rear wall 119 of the rack 23 into the receiving tube 152. Said openings 127 are so arranged that energy passing through one cannot be reflected back through another into said receiving tube 152.

A support device 128 (FIGURE 22) is provided on the front wall 118 above the opening 126 for receiving and holding a mark receiving member 129 upon each said rack 23, for reasons appearing hereinafter. In this particular embodiment, the mark receiving member is a chart, or card printed as a graph, having a separate marking zone 131 for each container position within the rack 23, and said support device or chart holder 128 is comprised of a pair of opposed grooves, which engage the upper and lower edges of said card. However, it will be apparent that other types of mark receiving members or surfaces and support devices therefor may be utilized within the concepts of this invention.

*E. Sensing Mechanism*

As shown in FIGURES 4, 5 and 14, the sensing mechanism 12 is part of the sensing and recording head 16, which is hingedly mounted upon the front surface of the front wall 17 by means of the bearings 104. In substance, the sensing mechanism 12 (FIGURES 5, 15, and 18) is comprised of a source 132 of radiant energy, a focusing system 133 for directing said radiant energy toward, and away from, the path of the sample containers 121 on the conveyor mechanism 11, and a pair of elements 134 and 135 which are sensitive to the energy from said source, and are arranged for receiving direct and reflected energy, respectively. The first element 134 is placed in position for receiving direct radiation from said source. The second element 135 is positioned for receiving the reflected energy collected by said focusing system.

The source 132 of radiant energy (FIGURES 15 and 18), either electromagnetic or corpuscular, visible light in this particular embodiment, is comprised of an electric lamp supported within the upper part of a cylindrical housing 137 mounted upon the base platform 103. The lamp 132 is surrounded by a cylindrical light chopper 138, rotatably supported within said housing 137 and mounted upon the upper end of the vertical shaft 139 (FIGURE 15) of a motor 141 located in the lower part of said housing 137. The light chopper 138 is provided with a plurality of radially disposed light openings 142, which are seven in number in this particular embodiment, and uniformly spaced around the periphery of said light chopper 138. The housing 137 is provided with a pair of circular, coaxial openings 143 and 144 on diametrically opposite sides thereof adjacent to said light chopper 138, so that radiation passing through the light openings 142 in said chopper can radiate from the housing 137 through the openings 143 and 144. Then opening 143 communicates with one end of a tube 145, whose lengthwise axis is aligned with a radius of the housing 137. The other end of said tube 145 communicates with an enclosure 146 in which the first element 134, here a photoelectric cell, is disposed. Means, such as the shutter 147, is provided for adjusting the aperture between said tube 145 and the enclosure 146. Because the first element 134 receives the direct radiation from the electric lamp 132, it may be referred to hereinafter as the "reference" element.

The opening 144 (FIGURES 15 and 18) in said housing 137 communicates with one end of the transmitting tube 151 of the focusing system 133, which system may also be referred to as the "optics" of the sensing mechanism 12. The receiving tube 152 of the optics 133 is disposed adjacent to, and is supported upon, the transmitting tube 151. The tubes 151 and 152 are disposed at an acute angle with respect to each other and they converge, away from the housing 137, toward a container engaging position, or examination station, 154. The sample container 121 (FIGURE 2), such as a transparent test tube, is snugly embraced in said position 154 by the converged ends of said transmitting tube and receiving tube, and the axis of the transmitting tube is preferably coincident with the extended radii of the container and directing said radiation onto the sample element disposed at the outer end of the receiving tube 152 adjacent to said sample container position 154 for gathering the radiation emanating from the contents of said container and directing said radiation onto the same element 135, which is disposed within the enclosure 155 communicating with the other end of the receiving tube 152. In this particular embodiment, said sample element is a photoelectric cell. Again, and in a manner similar to the reference cell, an adjustable slit mechanism 148 is employed to vary amplitude and phase of that portion of the energy directed toward the "examining" station.

As shown in FIGURES 14 and 21, the outer ends of the transmitting and receiving tubes 151 and 152 extend through the opening 126 in the front wall 118 of the racks 23 for embracing the side walls of a sample container which is located in the position 154. The container position 154 is located, with reference to the conveyor mechanism 11, directly above the location of the front shift pin 81 when it is at the rightward end of its stroke (FIGURE 14).

The synchronous motor 141 (FIGURE 15) operates within close tolerance at 3600 r.p.m. and the electric lamp 132 provides a substantially constant glow of substantially constant intensity. Thus, the light chopper 138, which is rotated around the lamp 132 by said motor 141 and which has seven light openings 142, directs approximately 420 light impulses per second through both the reference tube 145 and the transmitting tube 151. With this frequency of over 400 cycles per second, suitable electrical filtering means, discussed hereinafter, may be utilized to filter out the ambient radiation, such as that produced by 60 cycle illumination in the vicinity of the apparatus and stray reflected radiation from other similar sources. Suitable switches, not shown, may, if desired, be provided to disconnect the photocells 134 and 135 from the marking assembly 162 when the sensing head 16 is tilted away from the front wall 17. Thus, any stray radiation of the proper frequency which may enter the receiving tube 152 still will not produce an operation of said marking assembly.

The exhaust housing 106 (FIGURES 4 and 5), which contains an exhaust fan 156, has its outlet connected by the pipe 157 to the lower end of the cylindrical housing 137 through an appropriate opening in the base platform 103. Said fan 156 exhausts air from the conveyor compartment 25 and the drive compartment 36, and forces such air up through the interior of said cylindrical housing 137 and out through the ventilation openings 158 provided in the upper end of the housing 137, thus providing cooling means for the motor and the light source. The pivotal movement of the sensing and recording head 16, which is effected by the drive mechanism 14 in a manner described hereinafter, causes the optics 133, including the transmitting and receiving tubes 151 and 152, to be moved toward and away from the examination station 154 (FIGURE 14). Since the tubes 151 and 152 combine to embrace a sample container 121 disposed within the examination or observation station, it becomes apparent that the pivotal movement of the sensing and recording head 16 must be synchronized with the step-by-step transverse movement of the racks 23, hence, of the sample containers 121 disposed therein.

F. Recording Mechanism

The recording mechanism 13 (FIGURES 4, 5, 14, 16 and 17), which is also a part of the measuring head 16, is comprised of a timing assembly 161 and a marking assembly 162. The marking assembly 162 is mounted upon a support plate 163, which is in turn supported parallel with, and above, the base platform 103 of the measuring head 16 by means of a pair of flexible, but adequately stiff, sheet members 164 and 165. Said sheet members, which are substantially perpendicular to the front wall 17 of the frame 18 and parallel with each other, are secured to said platform 103. Said marking assembly 162 includes a screw 166 (FIGURE 5) which is rotatably supported upon, and between, a pair of spaced bearing plates 167 and 168, which are mounted upon, and spaced upwardly from, the support plate 163. A rider 169 is threadedly engaged by the screw 166 for movement lengthwise of said screw upon rotation thereof.

A pair of parallel, marker support rods 171 are secured to the rider 169 and extend sidewardly therefrom, adjacent to, and substantially parallel with, the front wall 17 of the frame 18. A marking device, such as the stylus head 172, is adjustably secured upon the rods 171 and is provided with a movable stylus 173. Said head is arranged so that said stylus is engageable with the mark receiving member 129 mounted upon the support device 128 of a rack 23 when said rack is disposed upon the conveyor mechanism 11 in said examination position. A guide device 174 is adjustably secured to said marker support rods 171 for slidably engaging a guide rod 175, which is secured to, and extends between, the bearing plates 167 and 168, substantially parallel with the screw 166. The guide device 174, cooperating with the guide rod 175, restricts the movement of the stylus head 172 with respect to the marking assembly 162 to vetrical movement.

A motor 176 (FIGURES 16 and 17) is mounted upon the lower bearing plate 168 so that its shaft 177 extends downwardly through an appropriate opening therethrough. The motor shaft 177 is connected to a shaft extension 178 of the screw 166 by appropriate reduction gears 179. The upper end of the screw 166 is connected, as by gears 181, to a feed-back control 182 supported upon, and depending from, the upper bearing plate 167. The motor 176 is a two phase, servo-type designed to operate from a 400 cycle source. One phase of the motor 176 is energized from the output of the reference photocell 134 and the other phase is operated in response to the difference between the outputs of the sample and the reference photocells. The feed-back control 182 is in the circuit with the reference photocell 134 and produces a balancing potential which brings the motor 176 to a null after a period of operation thereof. Thus, rotation of the screw 166, hence, movement of the rider 169, in a vertical direction is dependent upon the difference in output of the photocells 134 and 135.

Safety switches 183 and 184 (FIGURE 5) are mounted upon the upper and lower bearing plates 167 and 168, respectively, adjacent to the screw 166 for engagement by the rider 169. Said switches 183 and 184 are designed to prevent overrunning of the rider 169, which purpose is accomplished by shifting the phase of the control winding of the motor 176 and thereby reversing the direction of rotation of the screw 166. Normally, vertical movement of the rider 169 by the screw 166, as a result of detections and observations made by the sensing mechanism 12, will be limited so that, barring failures somewhere in the mechanism or the circuitry or an extraordinarily large signal as a reflection from the test tube surface when the mechanism is tilted part way back, the rider 169 will never actuate the switches 183 and 184. Further details concerning the electrical circuitry and the electronic mechanism involved in the apparatus 10 will be given hereinafter.

The stylus head 172 (FIGURES 5 and 21) is comprised, in this embodiment, of a housing 185 containing a coil 186, which encircles the stylus needle 173. The needle 173 is urged in the retracted position by a coiled spring 187 which also encircles the needle 173. The coil 186, when energized by means disclosed hereinafter, causes the needle 173 to be extended for the purpose of engaging and marking the mark receiving member 129.

The timing assembly 161 (FIGURES 16 and 17) is comprised of a clock mechanism 190, which is mounted upon the base platform 103 between the flexible members 164 and 165, and has an upwardly extending shaft 191, upon which a timing cam 192 is secured for rotation about a vertical axis. The cam 192 has an upwardly extending flange 193, which provides its cam surface and is engageable by, and trapped between, a cam follower device 194 secured to the lower surface of the support plate 163. The cam flange 193 and the cam follower 194 are so arranged that rotation of the clock shaft 191 will effect a constant, generally very slow, movement of the support plate 163 in a direction substantially perpendicular to the planes defined by the flexible members 164 and 165. The flexible members 164 and 165 tend to maintain the support plate 163 in a continuous attitude parallel with the base platform 103 during said constant movement of said support plate by the timing mechanism 161.

In this particular embodiment, the timing mechanism 161, including the clock mechanism 190 and the timing cam 192 is designed to effect a constant drive of the support plate 163, and the marking assembly 162 supported thereupon, in a leftward direction, as appearing in FIGURE 1. During such driving, the head 172 will be moved from a position about as shown in FIGURE 2 to a position about as shown in FIGURE 14. However, it will be recognized that the direction of drive can be reversed, if desired. It will also be recognized that, without departing from the scope of the invention, it is possible to effect the constant movement of the marking assembly 162 in a vertical direction while the screw 166 is disposed in a horizontal position, and such arrangements are contemplated by this invention.

G. Drive Mechanism

The drive mechanism 14 (FIGURES 8, 9, 16 and 19) includes a drive motor 201 mounted by the plate 200 upon the inside surface of the front wall 17 in the drive compartment 36. The drive motor shaft 202, which is horizontally disposed and parallel with said front wall 17, is connected to a coaxial line shaft 203 by a coupling 204. The line shaft 203 is rotatably supported upon the front wall 17 by means of the spaced bearing plates 205 and 206. As shown in FIGURES 19 and 19*a*, the coupling 204 is comprised of a pair of cylindrical members 207 and 208 which are secured upon the adjacent ends of the motor shaft 202 and the line shaft 203, respectively. Said members 207 and 208 have radially extending flanges 209 and 211, respectively, on their adjacent ends, said flange 209 being substantially larger in diameter than flange 211 and having an annular recess 212 into which the flange 211 is snugly and rotatably receivable. An annular ring 213 rotatably encircles the cylindrical member 208 adjacent to the flange 209 thereon.

The opposing surfaces of the ring 213 and flange 211 (FIGURE 19*a*) are provided with a plurality of radially disposed, V-shaped grooves 214 arranged in corresponding pairs. A ball bearing 215 is disposed between, and within, each pair of corresponding recesses 214. A plurality of bolts 216, whose axes are parallel with the line shaft 203, slidably extend through suitable openings 217 in the ring 213, and are threadedly engaged with the flange 209 radially outwardly from the recess 212 therein. Resilient means, such as a spiral spring 218, is sleeved upon each bolt 216 between its head and said ring 213. Thus, the ring 213 is resiliently urged toward the flange 209 and forced to rotate therewith. The cylindrical member 208 is caused to rotate with the cylindrical member 207 by the interengagement of the ball bearings 215 with the walls of the V-shaped grooves 214.

If an excessive torque is applied to the line shaft 203 in a direction contrary to the rotational direction of the drive motor shaft 202, the ball bearings will roll up the walls of the V-shaped grooves 214, thereby compressing the spiral springs 218, as the ring 213 is urged away from the flange 209. This will cause the ring 213 to engage one end of a lever 219, which is pivotally supported upon a bracket 221 mounted upon the front wall 17. The other end of said lever 219 is engageable with a micro-switch 222, which will be actuated by said lever 219 when the ring pivots said lever. The micro-switch 222 is arranged to disconnect the drive motor 201 from its source of power when said switch is actuated by the lever 219. Thus, since the drive motor 201 provides the source of power for effecting all of the mechanical movements of the apparatus 10, as will be disclosed immediately hereinafter, the deenergization of the motor 201 will bring to an immediate halt all of the mechanical operation of said apparatus.

As shown in FIGURE 19, the cylindrical member 207 has a radially extending finger 223 secured thereto for operating the switch 224 each time the shaft 202 rotates through 360°. Operation of the switch 224 releases electrical energy to the coil 186 surrounding the stylus needle 173, thereby causing said stylus needle to extend.

There are three cams 229, 230 and 231 (FIGURES 9 and 19) mounted upon the line shaft 203. The cam 229 (FIGURES 7, 9 and 19), which is closest to the coupling 204, is utilized to drive the transverse mechanism 34 of the conveyor mechanism 11. The cam 229 is peripherally engaged near its upper-edge by a roller 232 rotatably supported upon the horizontal leg 233 of an L-shaped lever 234. The lever 234 is pivotally mounted at its apex upon a shaft 235, which is secured to, and extends perpendicularly from, the front wall 17 above the drive motor 201. The vertical leg 236 of the lever 234 is pivotally engaged at its upper free end by the rightward end of the link rod 79, which is connected, as stated above, to the various parts of the transverse mechanism 34 for actuating same.

The cam 230 (FIGURES 16 and 19), which is adjacent to the cam 229 on the line shaft 203, is peripherally engaged near its lower edge by a roller 237, which is rotatably supported upon the inner end of the bracket 101, which extends through the opening 102 in the front wall 17. As mentioned previously, the bracket 101 is secured to the lower side of the base platform 103 of the sensing and recording head 16. Thus, pivotal movement of the bracket 101 and the platform 103 about bearings 104 caused by rotation of the cam 230 produces corresponding movement of the sensing head 16 toward and away from the front wall 17.

The cam 231 (FIGURES 8, 12 and 19) which is adjacent to the cam 230, is a circular, eccentrically mounted disk, which is peripherally engaged by, and rotatable with respect to, a ring 238. Said ring 238 is pivotally connected to one end of an adjustable rod 239, which is pivotally secured at its other end to a crank 241 (FIGURES 10 and 12) secured to the rocker shaft 35, said crank 241 forming a part of the crank device 49, in this particular embodiment.

The cams 229, 230 and 231 are so shaped and timed in their rotary motion that the operation of the conveyor mechanism 11 and the tilting of the sensing head 16 into and out of position adjacent to the front wall 17 are properly coordinated and synchronized. Obviously, this is a matter of design and adjustment which can be varied widely within the concepts of the invention.

Since the operation of the apparatus 10 depends, in this particular embodiment, upon reflection from the materials contained in a sample container 121, it may be desirable to agitate the materials within such container to ensure a relatively even distribution of the reflective materials. This may be accomplished by rotatably supporting a permanent bar magnet 243 (FIGURE 9) upon the front wall 17, just below the front rack way 31, for rotation about a substantially vertical axis. Means, such as the motor 244 and linkage 245 are provided for rotating said magnet. A piece of metal, responsive to a magnetic field, is then placed in the bottom of each sample container 121. Thus, as the racks 23, hence the containers 121, pass over the rotating bar magnet 243, said metal pieces in the containers will be rotated, thereby agitating the liquid within said containers.

H. *Electrical Circuitry*

Consideration will now be given to the electrical and electronic mechanisms associated with the above described apparatus. Most of such electrical and electronic mechanisms may be of conventional nature and this will be apparent to persons acquainted with equipment of this general type upon a reading of the above description relating to the mechanical and physical arrangements thereof. However, since certain combinations of the electrical and electronic mechanisms as used herein are believed to be unique, a full description of the invention will be better served by at least a general description of the electrical system.

Accordingly, and as shown schematically in FIGURE 27, a plurality of test tubes, comprising the containers 121 within which the test material is held, are arranged in a row. The light source 132 is associated with a suitable optical or focusing system indicated schematically at 133. One light beam from said source 132 is received on the reference photocell 134. Another light beam from said source is directed by the optical system 133 into a test tube located in the test position 154, is in this embodiment then reflected from whatever particles are contained therein thence to the mirror 153 and through a further optical system 152 onto the sample photocell 135. The reference photocell 134 is connected through a suitable cathode follower circuit 271 of conventional nature and through the resistance portion of a potentiometer 272 to ground. The slider of said potentiometer is connected through a further resistance 273 to a junction point 274. Said junction point is connected through the resistance portion of a third potentiometer 277, which is part of the feedback control 182 (FIGURE 17), to ground. The slider of said third potentiometer 277 is connected through a suitable summing amplifier circuit 278 and thence through a potentiometer resistance 276 to ground.

A twin T null network 270 capable of passing all frequencies other than a frequency equal to the frequency of the light segments emitted by the source 132 through the chopper 138, here 420 c.p.s., receives excitation from the output of the amplifier 278 and supplies feed-back pulses to the amplifier input at all frequencies existing in the circuit other than 420 c.p.s. This in a known manner helps to peak the response of the amplifier at 420 c.p.s.

The sample photocell 135 is connected by the conductor 279 to the input of the amplifier 278.

A fixed phase signal is conducted from the junction point 281, adjacent the cathode follower 271, through the fixed phase system 282 to one side of the switching mechanism or system 283 and thence to the fixed phase side of a two phase servo-motor 176. A control phase is applied from the the slider of the second potentiometer 276 through the control system 285 to the other side of the switching mechanism 283 and thence to the control phase side of said servo-motor 176. The servo-motor is connected to the slider of the third potentiometer 277 by means of the gears 181 (FIGURES 14 and 17). The servo-motor 176 is connected to the chart marking stylus head 172 (FIGURES 5 and 16) through the medium of the gearing 179 and screw mechanism 166 above described. Thus, variations in the output of the sample photocell with respect to the output of the reference photocell will result in rotation of said servo-motor in one direction or the other to bring about the operation of the head 172 elsewhere described herein in more detail.

More specifically, the fixed phase signal is conducted, in this embodiment, from the junction 281 by the conductor 284 through a clipper circuit 286 to an amplifier 287, which amplifier has a conventional twin T null network as a feed-back circuit to peak its output at a selected frequency in the same manner as above discussed with respect to the null network 270, and thence to an adjustable phasing network 288. The output of the phasing network 288 is conducted through a power amplifier 289 to an input winding of the fixed phase transformer 291. The output of said transformer is connected to a normally open contact of a first control switch 292 in said switch mechanism 283.

The control phase network or system 285 commences with the slider 293 of the second potentiometer 276 and includes a clipper circuit 294 whose output is fed through an amplifier 295, said amplifier having a twin T null network 296, feed-back arranged from its output to its input, and thence through an adjustable phasing network 297. The output of the adjustable phasing network is passed through a further amplifier 298 to the input side of a control phase transformer 299. The output of said control phase transformer is connected to the normally closed side of a second control switch 301 in said switch mechanism 283.

The operation of this electric circuitry is set forth in more detail below in connection with the operation of the entire mechanism.

The control switches 292 and 301 are a pair of double pole, double throw switches, arranged adjacent to the carriage or rider 169 on the screw 166 (FIGURE 5) in such a manner that when the carrier reaches the lower end of its travel it will move the armature of the lower switch 292 from its normally closed to its normally open position and when said carrier reaches the upper end of its travel it will move the armature of the upper switch 301 from its normally closed to its normally open position. The armature of the upper switch 301 is connected to the upper, normally closed, contact of the lower switch 292 and the armature of the lower switch 292 is connected, preferably through a mercury switch 302, to the control phase winding 303 of the servo-motor 176 and thence to ground. The upper, normally open, contact, of the upper switch 301 is connected by the conductor 304 through a suitable first reactive element 309, here a capacitor which in this particular embodiment is of two mfd. capacity, to a junction point 305 with the conductor 306. The junction point 305 is connected through a second reactive element 311, here also a capacitor of the same or at least generally similar capacity, thence preferably through a mercury switch 307 to and through the fixed phase winding 308 of the motor 176 to ground.

The mercury switches 302 and 307 are associated with the measuring head 16 and when said head 16 is tilted away from the containers 121, said mercury switches open the circuits and deenergize the motor 176. In this way, there is no danger of the motor 176 operating at any time other than when a reading is being taken.

OPERATION

Before initiating the operation of the apparatus 10, the conveyor mechanism 11 must first be loaded with the proper number of racks 23, which, in this particular embodiment, means that each section 26 and 27 of the conveyor compartment 25 must be filled with all of the racks which it will contain, less one. At the beginning of the operation of the apparatus 10, the two spaces provided by the missing racks will normally be located at the front end of the right section 27 and at the rear end of the left section 26. Thus, when the apparatus is energized, transverse mechanism 34 can start at once to move the rack at the front end of the left section 26 toward the right section 27, and, in a similar manner, the rack at the rearward end of the right section 27 will be moved toward the rear end of the left section 26.

The racks 23, which can each hold ten sample containers 121 in this embodiment, may be either partially or completely filled with said sample containers 121 and said containers may contain a sample of material to be tested or may be empty. However, the conveyor must be provided with a complete complement of racks 23, as above described, in order to effect normal operation of the conveyor mechanism 11.

If it is assumed, for illustrative purposes, that the sensing head 16 is tilted away from the front wall 17, the marking motor 176 will be disconnected from the photocells 134 and 135 by suitable switches which are closed when the head 16 is pivoted toward the front wall 17. The shift pins may be in a variety of different, but corresponding, positions, depending upon the position of the cam 229. However, it will be assumed, again for illustrative purposes, that the shift pins 81 and 96 are in the raised positions and at the commencing ends of their transverse strokes. When the apparatus 10 begins to operate, the shift pins will be within the first shift pin openings 124 in their respective, adjacent racks 23 preparatory to moving said racks the first step in their respective transverse, step-by-step movements.

Commencing with the apparatus 10 in the condition set forth above, one examination cycle of operation will include: simultaneous, single step movement of the front and rear racks transversely of the conveyor compartment 25, thereby placing a container 121 in examination position 154; rearward pivotal movement of the measuring head 16 toward the front wall 17; actuation of the recording mechanism 13 responsive to operation of the sensing mechanism 12; and frontward pivotal movement of the measuring head 16 away from the front wall 17. Ten examination cycles, in this particular embodiment, equal a rack cycle of operation wherein a rack is moved from a position completely within one chamber 26 or 27 to a position completely within the other chamber. Having completed this rack cycle, the forward and rearward mechanism 33 will move the front rack rearwardly in chamber 27 and will move the rear rack forwardly in chamber 26. This will place the next two succeeding racks in the front and rear positions ready for the first examination cycle in a new rack cycle. The apparatus will complete a sequence of operation when each rack has gone through a rack cycle. The timing assembly 161 will effect a relatively slow, continuous, transverse movement of the marking assembly 162 during said sequence of operation in preparation for another sequence of operation which will be automatically initiated at the end of the first sequence.

Considering the examination cycle in more detail, it will be observed that energization of the apparatus 10, hence the motor 201 (FIGURE 9), will rotate the transverse cam 229 and thereby raise the horizontal leg 233 of the lever 234. The link rod 79 (FIGURE 7) and the rest of the transverse mechanism 34, will convert this movement of lever 234 into a rightward movement of the front shift pin 81 and a corresponding leftward movement of the rear shift pin 96. This places the first sample container 121 in said rack, or the position within said rack which would normally contain said sample container, in the observation station 154 (FIGURE 14).

The head cam 230 (FIGURE 16) now urges the bracket arm 101 downwardly, thereby pivoting the measuring head 16 rearwardly toward the front wall 17. Simultaneously with such movement of the measuring head 16, the marking motor 176 will be connected to the photocells 134 and 135 and the shift pins 81 and 96 will be lowered as a result of the lowering of the lift arm 105 and the exhaust housing 106 within the drive compartment 36.

Shortly thereafter, the L-shaped lever 234 will be permitted to move downwardly by the cam 229, thereby permitting the springs 99 of the transverse mechanism 34 (FIGURE 7), to return the front shift pin 81 to its leftward position and the rear shift pin 96 to its rightward position.

As soon as the optics assembly 133 embraces the sample container 121 in said container position 154, the sample photocell 135 will become energized by radiation from source 132, which is reflected from the material within said sample container. As the turbidity of the material within the container position 154 increases, in this particular embodiment, the reflected radiation received by the sample photocell 135 will be correspondingly increased. The reference photocell 134 will receive direct radiation from source 132. The radiation received by both the reference photocell and by the sample photocell will be segmented according to the speed of operation of the chopper 138 and in this embodiment such frequency has been selected at 420 cycles per second. This figure can be varied widely but the one chosen is low enough to be reasonably easy to handle and yet it is high enough to be readily distinguishable by simple filter circuits from lower frequency illumination flickering such as 60 cycle flickering in a fluorescent lamp.

The reference signal appearing at the output of the reference photocell 134 passes through the cathode follower 271 and through the potentiometer 272 and the resistance 273 to the resistances in the potentiometer 277, which are here logarithmically arranged, and thence to ground. Potential is also taken from the resistor 290 by the slider of said potentiometer and conducted through the resistor 280 to the summing amplifier 278. The sample signal appearing at the output of the sample photocell 135 passes through the conductor 279 directly to the input of the summing amplifier 278. The reference and sample signals are of reverse polarity with respect to each other so that the output of the summing amplifier is the difference between these two signals. The output of the summing amplifier 278 is in part fed through the null network 270 back to the input of said amplifier to provide an inverse feed-back at frequencies other than 420 cycles per second, for the purpose of tuning said summing amplifier in a well known manner and making it thereby more accurately sensitive to the 420 cycles per second components of the input signals.

Resistor 275 is also provided with appropriately connected circuitry to provide a feed-back from the output of the summing amplifier 278 to the input thereof through a portion of the resistor 290. This is desirable where, as in this particular embodiment, the potentiometer 277 is of logarithmic nature for with the feed-back signal at the low output end of the potentiometer of sufficient strength to actuate the motor 176 the system would create over-control and hunting at the high end of said potentiometer. The use of the feed-back including the resistance 275 sufficiently suppresses the amplifier output in the high output positions of the potentiometer 277 to permit a sufficiently high output at the lower input end of the potentiometer without encountering the above mentioned hunting.

The output of the reference photocell appearing at juncture point 271 is then applied in the manner above indicated through the circuitry 282 to the fixed phase winding of the servo-motor 176, and the output of the summing amplifier, constituting the difference between the outputs of the reference photocell and the sample photocell, respectively, is applied through the circuitry 285 to the control phase winding of the servo-motor.

In this embodiment of the invention, and assuming the slider of the potentiometer 277 at its lower end and no signal from the sample photocell, there will be no input to the summing amplifier and hence no potential applied to the control phase winding of the motor. Thus, no rotation will occur. The appearance of a signal at the output of the sample photocell will cause potential to appear at the output of the amplifier 278 and this will effect the appearance of a potential in the control phase winding 303 and cause rotation of the servo-motor. Said rotation will under these conditions be in a direction to move said slider upwardly sufficiently to permit the portion of the input of the amplifier 278 originating in the reference photocell 134 to balance the portion supplied by the photocell 135 thereby again reducing to a null the output of amplifier 278 and thereby terminating the energization of the control phase winding 303. This stops the servo-motor. Since the stylus needle 172 also moves vertically in response to movement of the servo-motor, said needle has now assumed a position corresponding to the magnitude of the output of the sample photocell.

A further increase in the output of the sample photocell will actuate the servo-motor to move both the slider and the stylus 172 further upwardly and a decrease in the output of the sample photocell will affect said servo-motor oppositely and move both the slider and the stylus downwardly. In either case the movement will continue until the slider reaches a point where the reference photocell component and the sample photocell component at the input of the summing amplifier 278 cancel each other and the output of the summing amplifier is again substantially zero.

The rider 169 hence the stylus head 172, will remain in each position at least until the actuating finger 223 on the coupling 204 operates the switch 224, which energizes the stylus coil 186, thereby causing the stylus needle 173 to extend and mark the mark receiving member 129, such as a graph card, mounted upon the front wall 118 of the rack 23. The mark will occur in the zone 131 on said member 129 which corresponds to the container 121 in the observation station 154. Shortly after the stylus needle 173 is extended, and immediately retracted by the spring 187, the head cam 230 permits the sensing head 16 to tilt away from the front wall 17, thereby raising the front and rear shift pins 81 and 96 into the positions occupied at the beginning of the cycle.

Before the transverse cam 229 effects another movement of the shift pins 81 and 96, the rack cam 231, operating through the rod 239 and crank 241, will rotate the rocker shaft 35. Such rotation causes the rack engaging elements 41 and 42 in the right assembly 38 of the forward and rearward mechanism 33 to move forwardly for the purpose of engaging a rack 23 at the front end of the right chamber. However, for the elements 41 and 42 to engage a rack 23, said rack must be in the fully rightward position, that is, against the right side wall 22 of the compartment 25. Since the operation, as above described, is in the first examination cycle, only, the movement of the elements 41 and 42 will be ineffectual. The right element 41 will simply move forwardly and then rearwardly, without engaging anything. The hook 43 of the left element 42 will engage the rear wall 119 of the rack 23 being moved along the front wall 17 and no harm is done due to the lost motion mechanism created by the segments 46 and 47.

Simultaneously with such forward and then rearward movement of the rack engaging elements 41 and 42, said rack engaging elements 52 and 53 in the left assembly 39 located in the left chamber 26 will move rearwardly and then frontwardly. The operation of said elements 52 and 53 will be substantially identical, except for minor and obvious details, with the above described operation of the elements 41 and 42.

As soon as the rack elements 41 and 42, and 52 and 53 are cleared from the paths of the transversely moving racks 23 by the continued rotation of the rack cam 231, the transverse cam 229 will again cause the shift pins 81 and 96 to move their respective racks one position further transversely of said compartment 25. With this movement of the racks 23 transversely of the apparatus, a new examination cycle of operation is initiated and will be substantially the same as that described above with respect to the first examination cycle of operation. If the reflection of energy from the second sample is less than the reflection from the sample observed in the first cycle, the marking motor 176 will be rotated in the same direction as it was previously, thereby causing the rider 169 to move downwardly along the screw 166 an additional distance and until the feed-back control 182 again nulls the marking motor 176. However, if the reflection is greater from the second sample than from the previous sample examined, the balancing potential from the feed-back control 182 will be greater than the potential coming directly from the photocells and will thereby cause the motor 176 to rotate in the reverse direction, thereby causing the rider 169, hence the stylus head 172, to move upwardly until a null is again reached. The remainder of the operation, which includes the actuation of the stylus needle 173, will be the same as before.

More particularly, and with reference to FIGURE 27, the output of the cathode follower 271 will be converted into a fixed phase pulsating potential by, and applied through, the fixed phase circuitry 282 to the junction point 305 and thence through the capacitor 311 to the fixed phase winding 308 of the motor. Simultaneously, the same output of the cathode follower 271 is opposed by the oppositely polarized output of the sample photocell 135 and the net output of the system appearing at the input of the resistance winding of the second potentiometer 276 is applied through the control phase system 285 to provide a control phase pulsating potential which is applied through the switching system 283 to the control phase winding 303 of the motor. The difference between the output of the sample photocell 135 and the output of the reference photocell 134 will effect rotation of the servo-motor 176. This will cause movement of the carriage or rider 169 upwardly or downwardly, depending upon the direction of such rotation, until the slider of the third potentiometer 277 reaches a point where the output appearing at the winding of the second potentiometer 276 will exactly balance the fixed phase signal. Movement of the carriage 169 upwardly or downwardly will result in simultaneous, corresponding movement of the stylus support rods 171, hence the stylus head 172, after which a marking of the chart 129 is effected.

The switch system 283 operates to prevent overrunning of the screw 166 by the carriage 169. In the condition of the parts shown in FIGURE 27, it may be assumed for illustration that the control phase is so related to the fixed phase that the motor is moving the carriage 169 downwardly. If it goes downwardly enough to strike the armature of the lower switch 292, the control phase circuit 285 is momentarily broken. This will momentarily connect the control phase winding 303 to the fixed phase circuit 282 through the normally open terminal of the lower switch 292 and the conductor 306 at the junction point 305. The arrangement of parts comprising this connection, including the presence of the capacitor 311 is such as to reverse the rotation of the motor and thereby to move the carriage 169 upwardly. As the carriage 169 starts to move upwardly, the armature of the lower switch 292 will again move into its upward position. If the condition of the control phase signal is still such as to drive the carriage downwardly again, the armature of the lower switch 292 will again be moved into its lowermost position. Thus, the carriage will move upwardly and downwardly through a very short distance at the lower end of its normal range of movement and thus prevent damage to the screw mechanism.

Similarly, if the carriage 169 overruns at the upper end of its range of movement, it will move the armature of the upper switch 301 into the upper position and thereby break the control phase circuit 285. Thus, the control phase motor winding 303 will be energized by the fixed phase circuit 282 at the junction point 305 and through the capacitor 309, the upper switch 301 and the normally closed position of the lower switch 292. This arrangement is such as to cause the motor to reverse its rotation and move the carriage 169 downwardly and thereby prevent its jamming at the upper end of its range.

The apparatus 10 will continue to operate through ten successive examination cycles, in this embodiment, during which the front rack 23 is moved transversely of the compartment 25 into its fully rightward position. At this time, and only at this time, the rack engaging elements 41 and 42 will be able to engage, by means of their hooks 43, the front rack 23, thereby moving it toward the rear of the right chamber 27 a distance substantially equal to the thickness of the rack 23. Simultaneously, a rack located at the rear of the left chamber 26 will be engaged by the rack elements 52 and 53, thereby moving it forwardly and causing another rack 23 to be moved onto the front rack way 31 adjacent to the front wall 17. This shift of racks, which is referred to as a rack cycle, will be integrated with, and occur during, a normal examination cycle, which moves the front and rear racks 23 one position transversely of the apparatus. Thus, no time is lost and no allowances have to be made for exchanging racks when examination of the containers in one rack has been completed.

Racks may be removed from the conveyor compartment 25 during the operation of the apparatus so long as they are replaced by another rack, even an empty rack, in order to maintain the spacing relationship for the rack cycles. However, if the rack is removed and returned between the ends of a rack cycle, no replacement is necessary. Likewise, individual sample containers may be removed from the racks, as desired or required, during the operation of the apparatus. In the event that a malfunction occurs in the apparatus 10 whereby an unusual torque is required to rotate the line shaft 203 (FIGURES 19 and 19*a*) the cylindrical members 207 and 208 of the coupling 204 will tend to rotate with respect to each other upon the ball bearings 215. Such rotation will cause the member 208 to move axially and pivot the lever 219 to operate the micro-switch 222, whereby the drive motor 201 is disconnected from its source of energy.

As stated above, the marking assembly 162 is slowly and continuously moved by the timing assembly 161 in a direction which is disposed transversely of, and preferably perpendicular to, the direction of movement of the stylus head 172 effected by the screw 166 and rider 169. Thus, the marks made on the members 129 by the needle 173 in one sequence of operation will be offset, as shown in FIGURE 22, from the marks made during the preceding or following sequences of operation. By such arrangement, the marks in each zone 131 on the members 129 will produce a graph wherein the timing assembly 161 automatically provides the time axis. While said timing assembly will ordinarily operate at a constant rate of speed, other than constant movement by the timing assembly is within the purview of the invention.

ALTERNATE STRUCTURES

The alternate apparatus 250, shown in FIGURES 23 and 24, is comprised of a circular conveyor mechanism 251 rotatable upon a base frame 18*a* about a vertical axis. The conveyor mechanism 251 includes integral, container holding means, thereby eliminating the need for separate racks 23, shown in FIGURES 20 and 21. However, it is within the purview of this invention to have removable, arcuate racks supported upon, and movable along, a substantially stationary, circular conveyor mechanism 251. A suitable mark receiving member 249 may be carried upon said conveyor mechanism in substantially the same manner as said member 129 is mounted upon the racks 23. The sensing mechanism 252 and recording mechanism 253 may be substantially identical with those hereinabove disclosed with respect to the apparatus 10. The alternate apparatus 250 tends to lend itself readily to circumstances where it becomes desirable to record the transmissiveness, rather than the reflectiveness, of the sample in the sample container. In such case, the sample energy-sensitive element of the sensing mechanism 252, such as the photocell shown in broken lines at 254, is placed on the opposite side of the examination position 255 from the light source 256 of said sensing mechanism. However, it will be recognized that, by relatively minor changes in the sensing mechanism 12, the apparatus 10, the preferred embodiment disclosed in FIGURES 1 to 22 herein, may be modified for transmissive, rather than reflective, operation.

Also shown in FIGURE 23 is a separate device 257, such as a source of radiation, for applying external treatment to the material within the sample container 255 between observations by the sensing mechanism 252. As in the case of the apparatus 10, the alternate apparatus 250 (FIGURES 23 and 24) will be moved stepwise to effect automatic, successive observations of the sample containers supported upon the conveyor mechanism 251.

FIGURE 25 discloses the use of an alternate structure 259, including the cam 260, for effecting a constant, vertical movement of the mark receiving member 261 where the screw 262, for moving the stylus head 263 in response to examination of a sample 264, is disposed in an axially horizontal position. Thus, the two coordinates of the modification shown in FIGURE 25 are reversed to those shown and described with respect to the apparatus 10. The cam 260 may be driven by clock mechanism, not shown, in substantially the same manner as the clock mechanism 190 drives the timing cam 192.

FIGURE 26 illustrates a further modification of the structure shown in FIGURE 23, wherein the containers 121 may be replaced by any other type of receptacle or holder 265. Such holders may be disposed at uniform intervals along the conveyor mechanism 266, which may be circular, as in the alternate structure 250 (FIGURE 23). By way of example, samples of relatively solid materials, such as paint chips, could be placed in the holders 265, and, after exposure to simulated or actual weather conditions, tested for their reaction to such conditions by changes in their reflective powers.

It will be recognized that many other forms of, and uses for, the apparatus 10, and the alternate structures thereof disclosed herein, will become apparent to persons who become acquainted with the method and apparatus of this invention. Thus, although particular, preferred embodiments of the invention have been described hereinabove for illustrative purposes, it will be understood that variations or modifications thereof, which lie within the scope of the invention, are fully contemplated unless specifically stated to the contrary in the appended claims.

We claim:

1. In apparatus for measuring and recording on a chart data with respect to the radiation responsive characteristics of a plurality of samples, the combination comprising: conveyor means carrying said samples through a closed path and thereby repeatedly and successively presenting said samples to an observation point; a radiation source at said observation point for directing radiation to the sample positioned thereat; sensing means responsive to radiation emanating from the sample at said observation point in response to radiation from said source for providing an electrical output proportional to radiation emanating from said sample; recording means movable in a direction parallel with one coordinate of said chart in response to the value of the output of said sensing means; a holder for carrying a chart in a fixed position with respect to each of said samples; time controlled means for moving said recording means with respect to said holder in a direction parallen to another coordinate of said chart, said last named movement being at a selected rate with respect to the time intervals between successive presentations of a given sample to said observation point.

2. Apparatus according to claim 1 wherein said conveyor means includes: means defining first and second paths which are spaced from, and parallel with, each other, the first path passing through said observation point; means providing third and fourth paths which are spaced from, and parallel with, each other, said third and fourth paths being interposed between, and at a wide angle with respect to, said first and second paths; a plurality of container carrying devices, each of which carries a plurality of containers, and means for successively conveying said container carrying devices stepwise through said first path so that containers in each of said devices travel from an input end of said first path to said observation point and thence from said observation point to the discharge end of said first path; means for successively conducting container carrying devices through said third path from said first path to said second path and thence through said fourth path from said second path to said first path, said last named means being arranged to discharge a container carrying device from said third path onto said second path simultaneously with the discharge of a container carrying device from said fourth path onto said first path, and means conveying each of the container carrying devices from the portion of said second path adjacent to said third path to the portion of said second path adjacent to said fourth path in synchronism with the movement of a container carrying device through said first path.

3. In a device for measuring and recording data relating to a plurality of samples, the combination comprising: means conveying a plurality of said samples successively past a station point, each of said samples pausing momentarily at said station point; a measuring head including base structure and means mounting said base structure for moving said measuring head toward and away from a sample when same is pausing at said station point; said measuring head including a first leg having a source of radiation supported therein and means guiding radiation from said source to a sample located at said station point; said measuring head also including a second leg extending at an acute angle to said first leg, said second leg having receiving means arranged for receiving said radiation emanating from said sample and conveying same to sensing means spaced from both said source and said sample, said first and second legs being joined and having a forward edge for partially embracing said sample in order that the radiation from said source and the radiation emanating from the sample may be at a wide angle with respect to each other; said base means holding said first and second legs in such position with respect to said station point that upon the approach to said station point by said measuring head said sample will be partially embraced by said first and second legs and upon removal of said head away from said station point the sample will be free to move away from said station point.

4. In an automatic, recording nephelometer for measuring and recording data relating to the turbidity of a plurality of samples, the combination comprising: means for conveying a plurality of samples successively to an observation point: a measuring head including base structure and means mounting said base structure for moving said measuring head toward and away from a sample when same is at said observation point; a source of radiation supported on said head and means directing said radiation toward said observation point and into a sample located thereat; said measuring head also having radiation responsive sensing means thereon for receiving radiation emanating from said sample; said directing means and said sensing means being formed to partially embrace said sample when said measuring head is adjacent said observation point so that the radiation directed into said sample and the radiation emanating therefrom may be at a wide angle with respect to each other; said directing means and said sensing means being movable with said measuring head away from said observation point to permit a sample to move away from said point; indicia receiving means arranged for receiving data relating to each of said samples; and recording means responsive to the operation of said sensing means for recording indicia on said indicia receiving means.

5. In an automatic, recording nephelometer for measuring and recording data relating to the turbidity of a plurality of samples, the combination comprising: sensing means for providing an electrical output proportional to the turbidity of a sample when it is at an observation point; a chart for each sample; marking means movable in response to the electrical output of said sensing means along a coordinate axis of said chart a distance proportional to said output; means for moving said marking means into engagement with said chart to make a mark thereon when movement of said marking means is terminated and then moving said marking means away from said chart; and means for presenting the charts for the respective samples to said marking means in coordination with the presentation of the corresponding sample to the sensing means whereby the information with respect to the turbidity of a particular sample sensed by said sensing means may be recorded on the chart for such sample.

6. A device according to claim 3 wherein said source of radiation comprises a lamp; a cylindrical, rotatable, slotted shell surrounding said lamp for chopping the radiation emanating therefrom; a phototube mounted on said measuring head for receiving direct radiation from said lamp through the slots in said shell; optical elements in said first leg directing radiation from said lamp to the station point and a second phototube in said second leg for receiving radiation emanating from a sample at the station point.

7. The combination of claim 5 wherein each chart is stationary with respect to its associated sample and including means for moving the marking means in a direction corresponding to the other coordinate axis of the chart during the time interval between successive presentations of the same sample to the sensing means.

8. The combination of claim 5 wherein said sensing means includes a radiation source; a first phototube receiving radiation directly from said source and a second phototube receiving radiation emanating from the sample in response to exposure thereof to said radiation source; an electrical circuit for comparing the outputs of said phototubes, and motor means responsive to the output of said electrical circuit for moving said marking means along the coordinate axis of the chart until said marking means has moved a distance proportional to the output of said second phototube.

9. In an automatic, recording nephelometer for measuring and recording data with respect to the turbidity of a plurality of samples, in which the samples are presented to an observation point and the sample is inspected thereat, the combination comprising: a conveyor movable through a closed path for supporting the samples and successively and repetitively presenting same to the observation point; a chart associated with each of said samples and movable therewith by said conveyor; sensing means at said observation point for sensing the turbidity of each sample when it is at the observation point and providing an output proportional the value of said turbidity; and recording means responsive to the output of said sensing means for recording data on the chart associated with the sample being sensed by the sensing means whereby data indicating the value of said turbidity may be recorded on the charts for the respective samples in response to the sensing thereof by said sensing means.

10. In apparatus for measuring and recording data with respect to a characteristic of a plurality of samples, in which samples are presented to an observation point and the sample is inspected thereat, the combination comprising: a conveyor for supporting said samples and successively presenting same to the observation point, said conveyor being repetitively movable though a closed path to a repetitively present the samples to the observation point; a chart in fixed position with respect to each of said samples and being movable therewith by said conveyor, said chart having a coordinate axis indicating time and a coordinate axis indicating the value of said characteristic; a source directing radiation to a sample at said observation point and a radiation-responsive phototube at said observation point for sensing the value of radiation reflected from the sample and thereby providing an output indicating the value of said characteristic; recording means movable in response and proportional to the output of said sensing means along the coordinate axis indicating value for recording data on the chart associated with the sample being sensed by the sensing means; and means for shifting said recording means along the time axis of the chart for a sample between successive presentations of the chart a distance corresponding to each time interval between successive presentations of the sample to said sensing means whereby data indicating the value of the desired characteristic may be recorded on the charts for the respective samples in response to the sensing thereof by said sensing means and the values recorded on successive presentations of the same sample are spaced along the time axis of the chart for such sample.

11. In an automatic, recording nephelometer for measuring and recording data with respect to the turbidity of a plurality of samples, the combination comprising: radiation-responsive sensing means adapted to receive radiation indicating the value of said turbidity emanating from a sample and adapted to provide an output indicating the value of said turbidity; a conveyor for supporting and successively presenting samples to said sensing means so that radiation emanating from such samples is received by said sensing means, the conveyor being repetitively movable through a closed path to repetitively present the samples to said sensing means; a chart for each of said samples and fixedly secured with respect thereto for movement therewith, said chart having a coordinate axis indicating time and a coordinate axis indicating the value of said turbidity; recording means responsive to the output of said sensing means for recording data indicating the value of turbidity of the sample on the chart associated with the sample being sensed by said sensing means; a platform and means for supporting said recording means on said platform for movement in a direction parallel with the coordinate axis of the chart indicating time; a motor and means driven by motor for moving said recording means on said platform in timed relation with the movement of the conveyor so that between successive presentations of a given chart the recording means will be moved in a direction parallel with the time axis of the given chart a distance corresponding to the time interval between successive presentations of the given chart.

12. In apparatus according to claim 11 wherein said recording means includes a vertically extending, axially non-movable screw; a rider threaded on said screw and movable vertically therealong; a stylus carried by said rider; means for rotating said screw and thereby moving said rider vertically on said screw; a pair of horizontally spaced, flexible, vertically extending plates supporting said recording means; a timing motor; a cam driven by said timing motor; and a cam follower secured to said recording means and contacting said cam whereby said cam will cause said recording means to move in a direction parallel with the time axis of any given chart, said flexible plates yielding to permit such movement of the recording means.

13. In an automatic, recording nephelometer apparatus for measuring and recording data relating to the turbidity of a plurality of samples, the combination comprising: radiation-responsive sensing means for receiving radiation indicating the value of said turbidity emanating from a sample and providing an output proportional to turbidity; a plurality of light transmitting containers for holding the individual samples; racks for holding a group of containers and conveyor means for indexing said racks past said sensing means for successively presenting containers, one at a time, to said sensing means; a chart mounted on each of said racks and being divided into sections corresponding to the containers in said rack, each of said racks having an opening through the front wall thereof adjacent the lower end thereof whereby said sensing means may be brought adjacent the lower end of each of said containers; recording means responsive to the output of said sensing means for recording data of the section of the chart associated with the sample being sensed by the sensing means whereby data indicating the value of the desired characteristic may be recorded on the charts for the respective samples.

14. An apparatus according to claim 13 wherein said racks each having front and rear walls, end walls connecting said front and rear walls and a bottom wall; a plurality of container holding means secured to said rear wall; said front wall being spaced upwardly from said bottom wall to define an examination opening adjacent the lower end of the rack.

15. An automatic recording nephelometer, comprising: a plurality of racks and a plurality of light transmitting containers supported on each of said racks; conveyor means for repetitively moving said racks through a closed, substantially rectangular path, said conveyor means including means for moving said racks, one at a time, stepwise along two opposite sides of the rectangle in opposite directions, one of said sides having an observation station located adjacent thereto at one point thereon, so that each container pauses at said observation station during the stepwise movement of said racks, said conveying means also including means for moving said racks as a unit in opposite directions along the other two sides of the rectangle at intervals following stepwise movement of the racks along the two first-mentioned sides of the rectangle; a chart fixedly mounted with respect to each container and movable therewith by said conveyor means, said charts each having a coordinate axis indicating time and a coordinate axis indicating turbidity; a sensing mechanism and means for moving said mechanism into or out of engagement with a container at said observation station, said sensing mechanism including a light source for directing light into said container and a phototube for receiving light reflected from said container and for thereby providing an electrical output proportional to the turbidity of the contents of said container; a recording mechanism mounted on said sensing mechanism, said recording mechanism including marking means engageable with the chart associated with the container at the observation station; means supporting said marking means for movement in two directions along the coordinate axes of the charts; means operable when said marking means is spaced from the chart for the container at the observation station for moving said marking means along the turbidity coordinate axis of the chart in response to the electrical output of the phototube to position said marking means at a location indicating the value of the turbidity of the contents of said container; means for moving said marking means into engagement with the chart after said marking means reaches said location so that a mark is made on said chart and means for thereafter moving said marking means away from the chart; and means for moving said marking means in a direction along the time coordinate axis of the chart between successive presentations of the same container to the observation station so that successive marks on the same chart will be spaced apart along the time axis thereof.

References Cited in the file of this patent

UNITED STATES PATENTS

| | | |
|---|---|---|
| 565,305 | Shanklin | Aug. 4, 1896 |
| 1,049,133 | Murphy | Dec. 31, 1912 |
| 1,076,447 | Pindstofte | Oct. 21, 1913 |
| 1,783,093 | Molins | Nov. 25, 1930 |
| 2,125,345 | Hunt | Aug. 2, 1938 |
| 2,411,991 | England et al. | Dec. 3, 1946 |
| 2,426,355 | Kellogg | Aug. 26, 1947 |
| 2,427,790 | Korman | Sept. 23, 1947 |
| 2,431,899 | Wolf et al. | Dec. 2, 1947 |
| 2,436,145 | Johnson | Feb. 17, 1948 |
| 2,508,169 | Jones | May 16, 1950 |
| 2,590,827 | Stamm et al. | Mar. 25, 1952 |
| 2,648,040 | Schneider | Aug. 4, 1953 |
| 2,693,991 | Holtz | Nov. 9, 1954 |
| 2,766,095 | Molyneux et al. | Oct. 9, 1956 |

FOREIGN PATENTS

| | | |
|---|---|---|
| 401,178 | Great Britain | Nov. 9, 1933 |
| 1,110,766 | France | Oct. 19, 1955 |

UNITED STATES PATENT OFFICE

CERTIFICATE OF CORRECTION

Patent No. 3,026,764 March 27, 1962

Wade W. Allen et al.

It is hereby certified that error appears in the above numbered patent requiring correction and that the said Letters Patent should read as corrected below.

Column 12, lines 11 and 12, for "container and directing said radiation onto the sample element" read -- container. A reflective surface, such as the mirror 153, is --; same column, line 16, for "same" read -- sample --.

Signed and sealed this 31st day of July 1962.

(SEAL)
Attest:

ERNEST W. SWIDER
Attesting Officer

DAVID L. LADD
Commissioner of Patents